United States Patent
Tamura

(10) Patent No.: US 8,752,050 B2
(45) Date of Patent: Jun. 10, 2014

(54) WORKFLOW PROCESSING SYSTEM, AND METHOD FOR CONTROLLING SAME

(75) Inventor: Yuu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 640 days.

(21) Appl. No.: 12/719,688

(22) Filed: Mar. 8, 2010

(65) Prior Publication Data

US 2010/0235842 A1    Sep. 16, 2010

(30) Foreign Application Priority Data

Mar. 11, 2009   (JP) ................. 2009-058735

(51) Int. Cl.
   *G06F 9/46*   (2006.01)
(52) U.S. Cl.
   USPC ........... 718/100; 718/101; 718/102; 718/103; 718/104
(58) Field of Classification Search
   None
   See application file for complete search history.

(56) References Cited

U.S. PATENT DOCUMENTS

| | | | |
|---|---|---|---|
| 2004/0111430 A1* | 6/2004 | Hertling et al. | 707/104.1 |
| 2006/0026595 A1 | 2/2006 | Nakayama et al. | |
| 2007/0107012 A1* | 5/2007 | Rachamadugu | 725/34 |
| 2008/0201191 A1* | 8/2008 | Carter | 705/8 |

FOREIGN PATENT DOCUMENTS

| | | |
|---|---|---|
| JP | H7-44441 A | 2/1995 |
| JP | 2006-040139 A | 2/2006 |

OTHER PUBLICATIONS

Japanese Office Action issued in corresponding application No. 2009-058735 on Apr. 23, 2013.

* cited by examiner

Primary Examiner — Emerson Puente
Assistant Examiner — Jonathan R Labud
(74) Attorney, Agent, or Firm — Carter, DeLuca, Farrell & Schmidt, LLP

(57) ABSTRACT

According to the present invention, any deficiency caused by the use of a resource, which is in a different state from that assumed upon workflow registration, can be prevented. The workflow processing method of the present invention acquires and holds a resource or feature quantity, which is required upon workflow execution, so as to employ it upon workflow execution. In this manner, after execution of the workflow, the present invention can avoid the workflow execution result which is not intended by a user who has registered the workflow.

9 Claims, 21 Drawing Sheets

WORKFLOW PROCESSING SYSTEM, AND METHOD FOR CONTROLLING SAME

BACKGROUND OF THE INVENTION

1. Field of the Invention

The present invention relates to a workflow processing system, a workflow processing apparatus, and a workflow processing method for processing a workflow in which a series of operations is defined. In particular, in the present invention, a resource upon workflow registration is previously prepared, whereby the resource upon workflow registration can be utilized upon workflow execution.

2. Description of the Related Art

A workflow as a mechanism for executing previously-defined process in sequence is known. For example, work efficiency may be improved by automating the procedure of the workflow. On the other hand, various resources may be utilized during the processing of the workflow. However, when the resource is stored in a shared storage, any change may be applied to the resource between the time the workflow is registered and the time the resource is utilized by the workflow. In such a case, the resource, which is in a different state from that assumed upon workflow registration, is used upon workflow execution. This may cause a workflow execution result that is not intended by a user who has registered the workflow.

For example, in a workflow for inputting data on a Web page and making a printout in accordance with a predetermined format, the format upon an output of the data may be collapsed when the length of a character string and the size of an image, which are longer and bigger respectively than the character string length and the image size which are supposed to be in the format, are inserted. In such a workflow, if the resource in a predetermined format is changed at some midpoint after a user has input data, the length of the character string and the size of the image which have been input by the user are unexpected in the new format, resulting in a failure to output in the correct format.

In addition, there is another type of workflow in which a document, which is registered in a document management system, is checked out to convert data in accordance with a predetermined format based on the information described in the document. In this workflow, if a document, which is registered in a document management system, is checked out by another user, a document checkout by the workflow may cause a failure, and consequently the execution of the workflow cannot be continued.

Japanese Patent Laid-Open No. 7-44441 discloses a mechanism for conducting a change notification to a resource creator when any change is applied to the resource. In other words, by utilizing this mechanism, a notification indicating that the resource has been changed is sent to the resource creator when any change has been applied to the resource.

However, in the prior art described above, although a resource change notification is sent to a resource creator, it is difficult to prevent the occurrence of any problems in which the workflow execution result is not intended by a user who has registered the workflow. In addition, even if an instruction is made from a user after the resource change notification, it is still difficult to prevent the advantage of the automated procedure of the workflow from being impaired.

SUMMARY OF THE INVENTION

It is an object of the present invention to prevent the occurrence of any deficiency caused by the use of a resource which is in a different state from that assumed upon workflow registration. The workflow processing method of the present invention acquires and holds a resource or feature quantity, which is required upon workflow execution, so as to employ it upon workflow execution. In this manner, after execution of the workflow, the present invention can avoid a workflow execution result which is not intended by the user who has registered the workflow.

In order to achieve the aforementioned object, according to an aspect of the present invention, a workflow processing system is provided that includes: a workflow managing unit configured to register or store a workflow; a resource list generating unit configured to generate a resource list relating to a part or whole of a resource to be used in the workflow; a resource instructing unit configured to instruct which resource either upon workflow registration or upon workflow execution is to be used for each resource in the resource list; a resource acquiring unit configured to acquire the resource upon workflow registration, when the resource instructing unit has received an instruction to use the resource upon workflow registration; and a workflow executing unit configured to interpret and execute the workflow that has been stored in the workflow managing unit, wherein if the resource upon workflow registration is acquirable by the resource acquiring unit, the workflow executing unit executes the workflow using the resource that has been acquired by the resource acquiring unit, and wherein if the resource upon workflow registration is not acquirable by the resource acquiring unit, the workflow executing unit executes the workflow using the resource upon workflow execution.

Further features of the present invention will become apparent from the following description of exemplary embodiments with reference to the attached drawings.

DESCRIPTION OF THE EMBODIMENTS

Hereinafter, preferred embodiments of the present invention will now be described with reference to the accompanying drawings. The workflow processing apparatus according to an embodiment of the present invention is realized on a system consisting of a personal computer (hereinafter referred to simply as "PC") having the configuration shown in FIG. 1, for example.
<First Embodiment>

Figure 1:
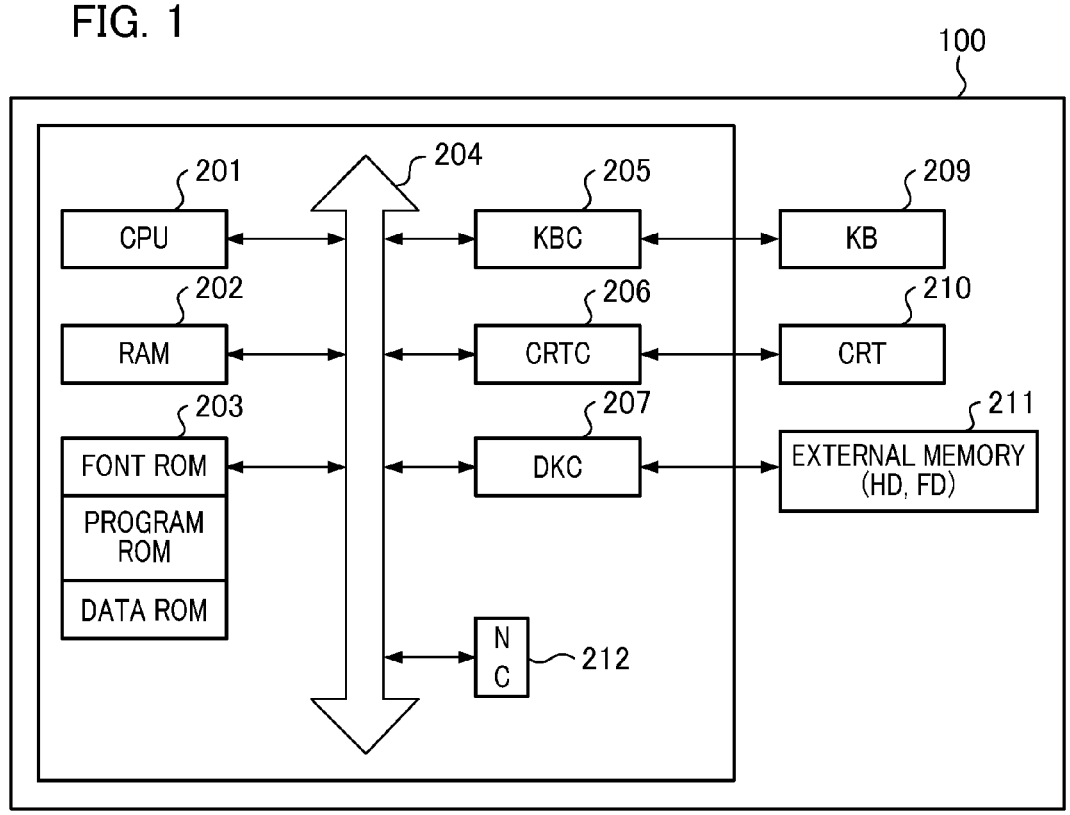
FIG. 1 is a view showing an example of a configuration of a typical computer 100.

FIG. 1 is a view showing an example of a configuration of the typical computer 100. It should be noted that the hardware block diagram shown in FIG. 1 corresponds to the hardware block diagram of a typical information processing apparatus, and the hardware configuration of the typical information processing apparatus can be applied to the computer 100 of the present embodiment.

In FIG. 1, a CPU (Central Processing Unit) 201, a RAM (Random Access Memory) 202, a ROM (Read Only Memory) 203 are connected to a bus 204. A keyboard controller (hereinafter referred to simply as "KBC") 205, and a CRT controller (hereinafter referred to simply as "CRTC") 206 are provided. Furthermore, a disk controller (hereinafter referred to simply as "DKC") 207, and a network controller (hereinafter referred to simply as "NC") 212 are provided. These components transmit and receive data via the bus 204.

The CPU 201, which serves as a control center of the computer, interprets and executes a program. The program is stored in the program ROM of the ROM 203, or is a program such as an OS, an application, or the like that is loaded from a storage device 211 such as a hard disk to the RAM 202. The OS abbreviation is used herein to refer to an operating system running on a computer, and the operating system is hereinafter called "OS". The processing shown in flowcharts to be described below can be realized by the execution of the program. In the present example, the ROM 203 includes a program ROM, a font ROM, and a data ROM.

The RAM 202 serves as the main memory, work area, and the like for the CPU 201, and is configured by using a non-volatile memory device or the like. The KBC 205 controls a key input from a keyboard 209 constituting a operation unit, a direction operation input from a pointing device (not shown), and the like. The CRTC 206 controls the display on a CRT display 210 constituting a display unit. Also, the DKC 207 controls data access for the storage device 211 such as a hard disk (HD), a flexible disk (FD), or the like for storing various data. The NC 212 is connected to a network such as a LAN, WAN, or the like so as to perform communication control processing with other devices connected to the network.

Figure 2:
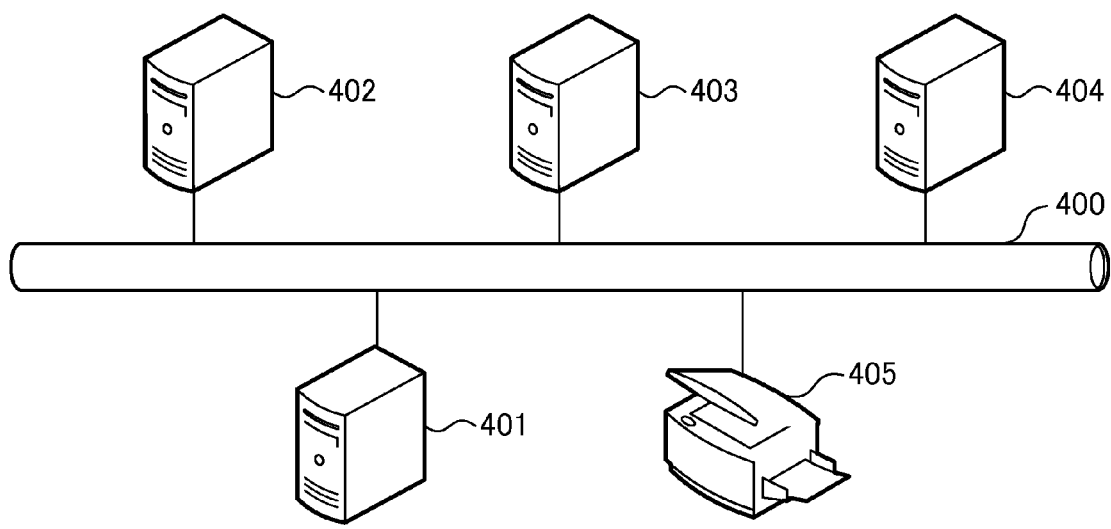
FIG. 2 is a view showing an example of a network configuration according to an embodiment of the present invention.

FIG. 2 is a view showing an example of a network configuration according to an embodiment of the present invention. A workflow management server 401 is a server that generates a workflow, interprets it, and performs the execution instruction. Each of servers 402, 403, and 404 is a workflow executing server that performs each process defined in the workflow that has been received from the workflow management server 401, and constitutes a workflow executing unit together with an image processing apparatus to be described below. In the example shown, the document management server 402, the form generation server 403, and the output management server 404 are connected to the network 400. Furthermore, an image processing apparatus 405 is connected via the network 400. It should be noted that the workflow management server 401 can further serve as any one of or a plurality of the workflow executing servers 402 to 404. In other words, the aforementioned structure need not be limited to the structure such that the workflow executing server is provided separately outside the device of the workflow management server, but both functions of the workflow management server and the workflow executing server may be realized in the same device. Also, the workflow management server 401 and the workflow executing servers 402 to 404 may be set up on a PC or on the image processing apparatus 405.

Figure 3:
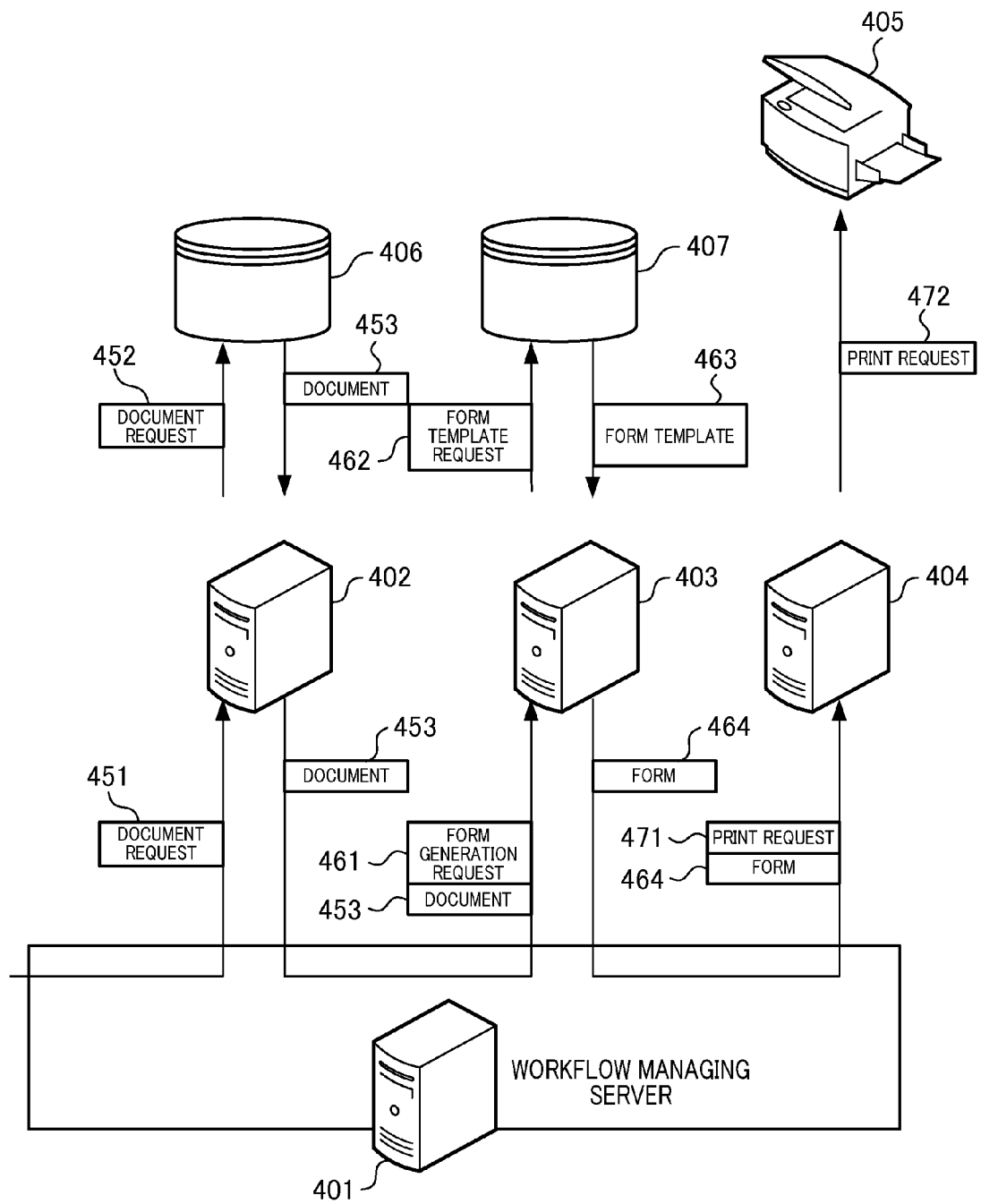
FIG. 3 is a view for explaining an exemplary procedure for workflow processing according to an embodiment of the present invention.

FIG. 3 is a view for explaining an exemplary procedure for workflow processing according to an embodiment of the present invention. In the present invention, it goes without saying that the procedure for workflow processing is not limited to the procedure shown in FIG. 3.

The workflow management server 401 makes a document request 451 to the document management server 402 in accordance with the previously-generated workflow. The document management server 402 makes a document request 452 to a document DB (database) 406 in accordance with the request from the workflow management server 401 so as to obtain a document 453. Then, the document management server 402 returns the obtained document 453 to the workflow management server 401.

When the workflow management server 401 receives the document 453 from the document management server 402, the workflow management server 401 makes a form generation request 461 to the form generation server 403 in accordance with the previously-generated workflow, and sends the document 453 as well. The form generation server 403 makes a form template request 462 to a form template DB 407 in accordance with the request from the workflow management server 401 so as to obtain a form template 463. Then, the form generation server 403 generates a form 464 from the form template 463 and the document 453, and returns the generated form 464 to the workflow management server 401.

When the workflow management server 401 receives the form 464 from the form generation server 403, the workflow management server 401 makes a printing request 471 to the output management server 404 in accordance with the previously-generated workflow, and sends the form 464 as well. The output management server 404 makes a printing request 472 to the image processing apparatus 405 in accordance with the request from the workflow management server 401 so as to print the form 464. The image processing apparatus 405 performs output processing in accordance with the printing request 472 from an output management server to complete the workflow.

Figure 4:
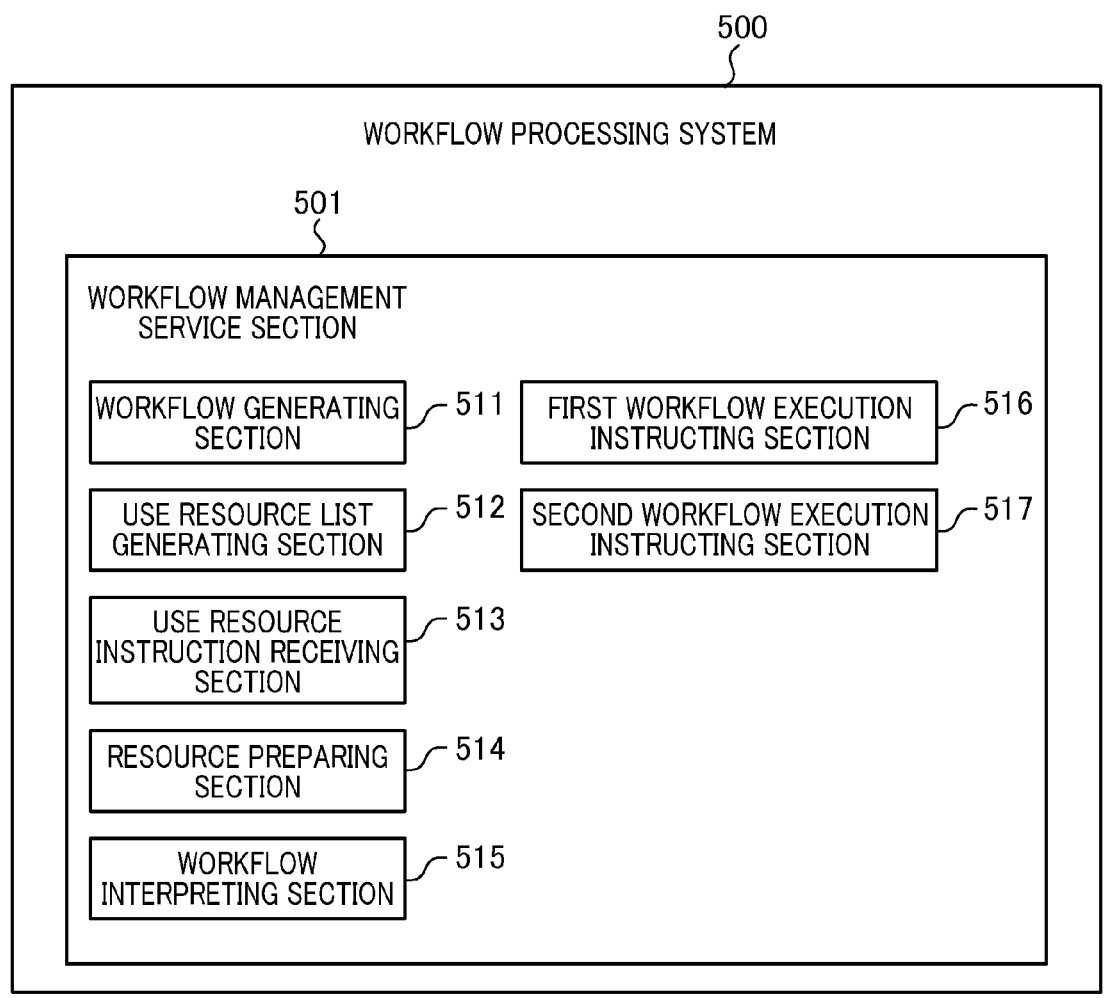
FIG. 4 is a view for explaining the first embodiment of the present invention in conjunction with FIGS. 5 and 6, and is a module configuration diagram showing a workflow management service section.

FIG. 4 is a module configuration diagram of a workflow management service section according to the present embodiment. The workflow management service section 501 is configured as a workflow managing unit on the workflow management server 401, and performs workflow generation, registration, storage, its interpretation, and execution instructions. It should be noted that in the application of the present invention, the workflow management service section 501 is configured on the workflow management server 401, but not limited thereto (a workflow managing unit may be configured with a plurality of servers).

The workflow management service section 501 includes a workflow generating section 511, a use resource list generating section 512, a use resource instruction receiving section 513, a resource preparing section 514, and a workflow interpreting section 515. The workflow management service section 501 further includes a first workflow execution instructing section 516 and a second workflow execution instructing section 517.

The workflow generating section 511 generates a workflow for registration and storage. The workflow interpreting section 515 interprets processing defined in the workflow that has been generated by the workflow generating section 511. The use resource list generating section 512 generates a list (hereinafter referred to as "use resource list") describing a part or whole of resource to be used in the generated workflow. Also, the use resource instruction receiving section 513 receives instructions about which resource either upon workflow registration or upon workflow execution is to be used for each resource in the generated use resource list.

When the instruction that has been received by the use resource instruction receiving section 513 indicates using the resource upon workflow registration, the resource preparing section 514 prepares by reserving the resource so that the resource upon workflow registration can be acquired upon workflow execution. The first workflow execution instructing section 516 or the second workflow execution instructing section 517 instructs the workflow executing servers 402 to 404 to execute the workflow. The reason why two workflow execution instructing sections are provided is because the resource to be used differs depending on the presence or absence of the resource that has been prepared by the resource preparing section 514. In other words, when the resource that has been prepared by the resource preparing section 514 is present, the first workflow execution instructing section 516 instructs the workflow executing servers 402 to 404 to execute the workflow by using the prepared resource. When the resource that has been prepared by the resource preparing section 514 is not present, the second workflow execution instructing section 517 instructs the workflow executing servers 402 to 404 to execute the workflow by using the resource upon workflow execution.

In the present example, the description is given for the case where the contents of execution instruction using two workflow execution instructing sections 516 and 517 are separated into each case for ease of understanding. However, it goes without saying that only one workflow execution instructing section may be prepared so as to have the above execution instruction executed by the workflow executing server depending on the result of condition determination relating to the presence or absence of the prepared resource.

Figure 5:
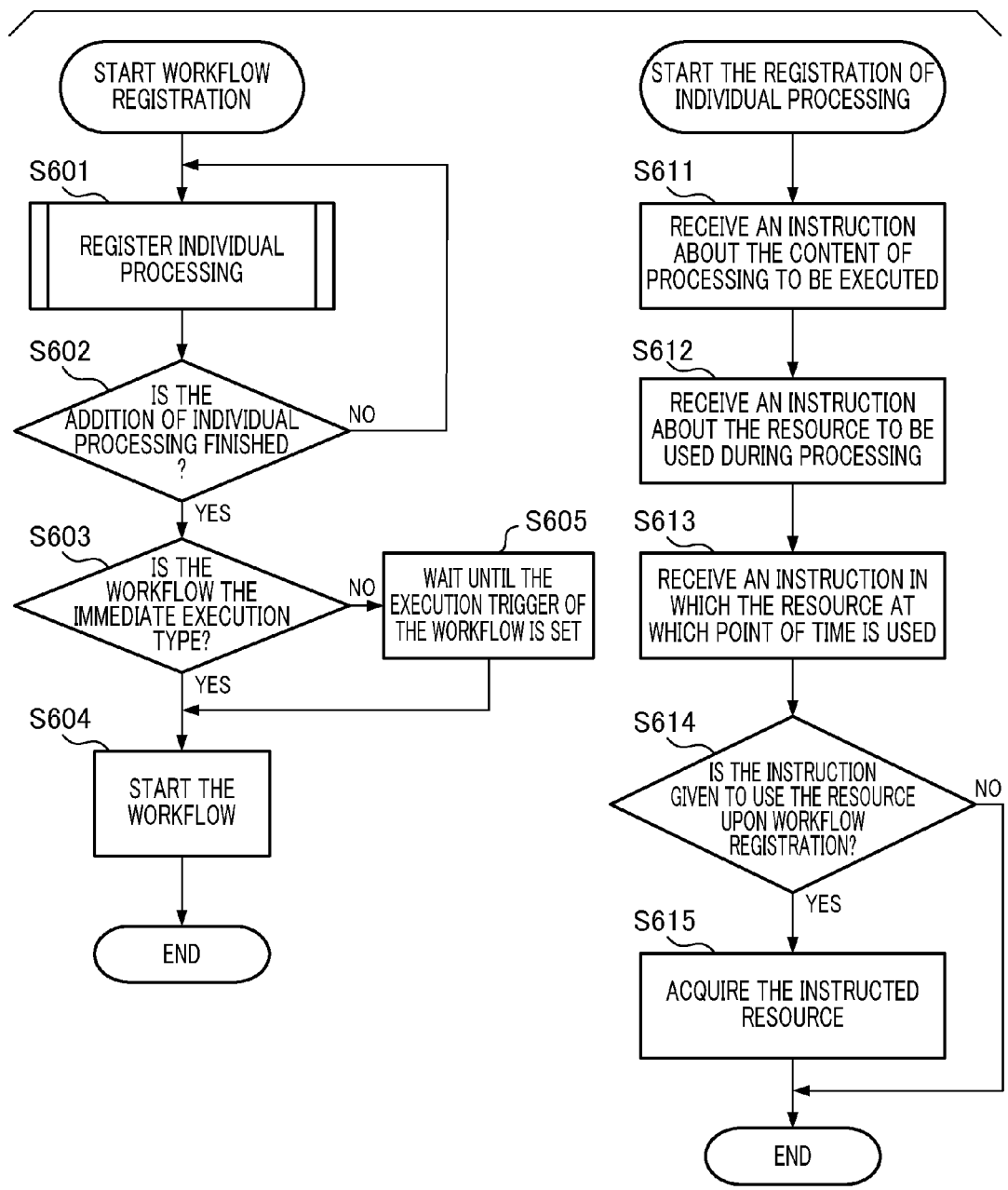
FIG. 5 is a flowchart showing an example of processing in the case in which a resource to be used in the workflow is acquired in advance.

FIG. 5 is a flowchart showing an example of processing in the case in which a resource to be used in the workflow is acquired in advance. In step S601, the workflow generating section 511 registers individual processing included in the workflow. The details of step S601 will be described below in steps S611 to S615.

In step S602, the workflow generating section 511 determines whether or not the registration of individual processing included in the workflow is all completed. As a result, if the registration is incomplete, the process returns to step S601 to repeat the registration. If the registration is completed, the process advances to step S603. In step S603, the first workflow execution instructing section 516 or the second workflow execution instructing section 517 determines whether or not the workflow that has been generated by the workflow generating section 511 in steps S601 and S602 is the workflow for immediate execution. As a result, if the generated workflow is not the workflow for immediate execution, the process advances to step S605. If the generated workflow is the workflow for immediate execution, the process advances to step S604.

In step S604, the first workflow execution instructing section 516 or the second workflow execution instructing section 517 instructs the workflow executing servers 402 to 404 to execute the generated workflow. This allows them to start executing the workflow. In step S605, the first workflow execution instructing section 516 or the second workflow execution instructing section 517 waits until an execution instruction for the generated workflow is given. Then, the process advances to step S604.

Hereinafter, the flowchart for the registration of individual processing included in the workflow will be described in accordance with steps S611 to S615. First, in step S611, the workflow generating section 511 receives an instruction about the content to be executed in the workflow from a user.

In step S612, the use resource list generating section 512 receives an instruction from the user about the resource to be used in the workflow so as to generate a use resource list. In step S613, the use resource instruction receiving section 513 receives an instruction from the user about whether the resource to be used in the workflow is the resource upon workflow registration or the resource upon workflow execution.

In step S614, the resource preparing section 514 determines the content of the instruction that has been received by the use resource instruction receiving section 513 from the user in step S613. As a result, if it is determined that an instruction to use the resource upon workflow registration has been provided, the process advances to step S615. If it is determined that an instruction to use the resource upon workflow execution has been provided, the process is terminated.

In step S615, the resource preparing section 514 acquires the relevant resource in the use resource list that has been generated in step S612 in accordance with the content of the instruction that has been received from the user in step S613. Then, a series of operations is terminated.

Figure 6:
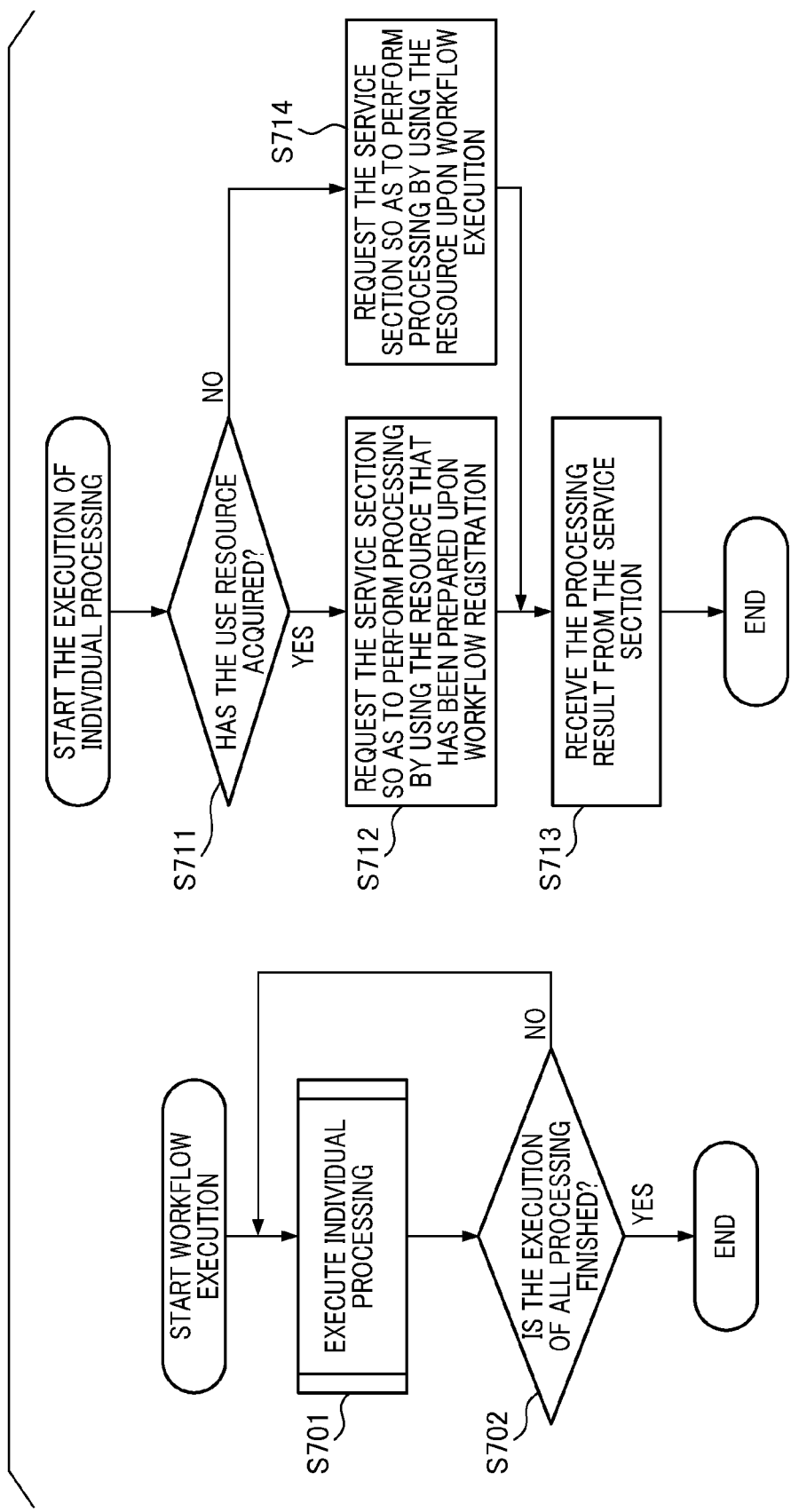
FIG. 6 is a flowchart showing an example of processing in the case in which the workflow is executed by using the previously-acquired resource.

FIG. 6 is a flowchart according to the present embodiment showing an example of processing in the case in which the workflow is executed by using the previously-acquired resource.

In step S701, the workflow interpreting section 515 interprets the workflow that has been generated by the workflow generating section 511 in the steps S601 and S602, and instructs that the workflow be executed. The details of step S601 will be described below in steps S711 to S714.

In step S702, the workflow interpreting section 515 determines whether or not the execution of individual processing included in the workflow is all completed. As a result, if the execution is incomplete, the process returns to step S701, whereas if all the processing is completed, a series of operations is terminated.

Hereinafter, the flowchart for the execution of individual processing included in the workflow will be described in accordance with steps S711 to S714.

First, in step S711, the workflow management service section 501 determines whether or not the resource that has been previously acquired by the resource preparing section 514 is present. As a result, if it is determined that the previously-acquired resource is present, the process advances to step S712. If it is determined that the previously-acquired resource is not present, the process advances to step S714.

In step S712, the first workflow execution instructing section 516 instructs the workflow executing servers 402 to 404 to execute the workflow so as to cause them to process the workflow by using the resource that has been previously acquired by the resource preparing section 514. After the execution instruction of the workflow has been carried out, the process advances to step S713.

In step S713, the workflow management service section 501 waits for the result of the workflow execution instruction. This instruction is the workflow execution instruction given by the first workflow execution instructing section 516 or the second workflow execution instructing section 517 in step S712 or step S714. The workflow management service section 501 receives the workflow execution result from the workflow executing servers 402 to 404, and then the process is terminated.

In step S714, the second workflow execution instructing section 517 instructs the workflow executing servers 402 to 404 to execute the workflow by using the resource upon workflow execution. Then, the process advances to step S713.

According to the present embodiment, a necessary resource may be previously acquired upon workflow registration to utilize the resource upon workflow execution. Hence, this prevents the workflow execution result from differing from the intention of the user who has registered the workflow.

<Second Embodiment>

Hereinafter, the second embodiment of the present invention will be described.

Figure 7:
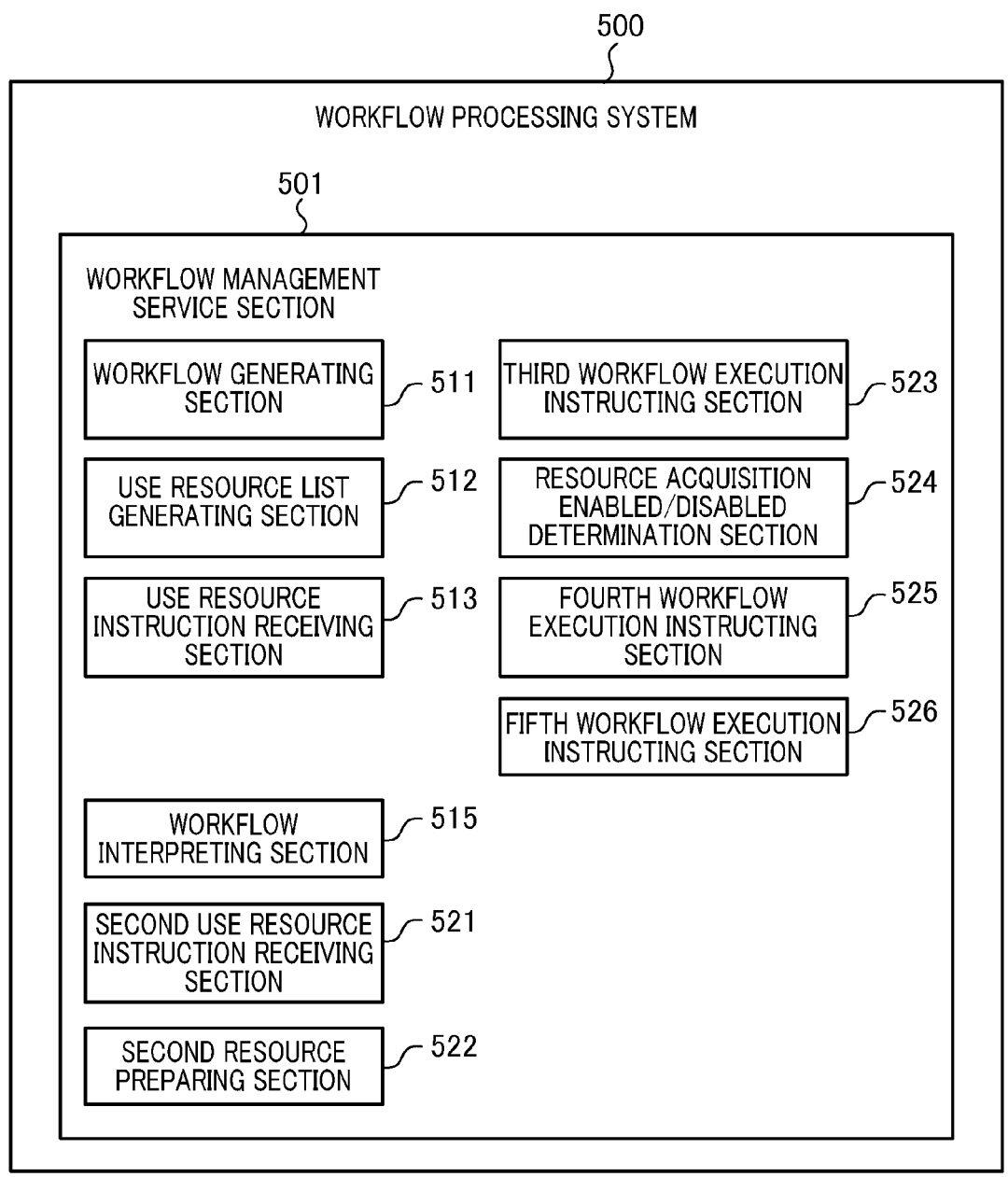
FIG. 7 is a view for explaining the second embodiment of the present invention in conjunction with FIGS. 8 and 9, and is a module configuration diagram showing a workflow management service section.

FIG. 7 is a module configuration diagram of a workflow management service section according to the second embodiment of the present invention. The workflow management service section 501 includes the workflow generating section 511, the use resource list generating section 512, the use resource instruction receiving section 513, and the workflow interpreting section 515. Furthermore, a second use resource instruction receiving section 521, a second resource preparing section 522, a third workflow execution instructing section 523, a resource acquisition enabled/disabled determining section 524, a fourth workflow execution instructing section 525, and a fifth workflow execution instructing section 526 are provided.

As described above, the workflow interpreting section 515 interprets the workflow that has been generated by the workflow generating section 511. The second use resource instruction receiving section 521 receives an instruction about which resource is to be preferentially used either upon workflow registration or upon workflow execution. The second resource preparing section 522 makes preparations so that upon workflow registration, the resource can always be acquired upon workflow execution.

The third workflow execution instructing section 523 instructs the workflow executing servers 402 to 404 upon workflow execution. In other words, if the instruction that has been received by the second use resource instruction receiving section 521 is an instruction for prioritizing the resource upon workflow registration, the third workflow execution instructing section 523 instructs the workflow executing server to execute the workflow using the resource that has been prepared by the second resource preparing section 522. The resource acquisition enabled/disabled determining section 524 determines whether or not the resource is acquirable upon workflow execution when, upon workflow execution, the instruction that has been received by the second use resource instruction receiving section 521 is the instruction for prioritizing the resource upon workflow execution.

The fourth workflow execution instructing section 525 instructs the workflow executing servers 402 to 404 upon workflow execution. In other words, if the resource upon workflow execution is not acquirable as a result of a determination made by the resource acquisition enabled/disabled determining section 524, the fourth workflow execution instructing section 525 instructs the workflow executing server to execute the workflow using the resource that has been prepared by the second resource preparing section 522.

The fifth workflow execution instructing section 526 instructs the workflow executing servers 402 to 404 upon workflow execution. In other words, if the resource upon workflow execution is acquirable as a result of a determination made by the resource acquisition enabled/disabled determining section 524, the fifth workflow execution instructing section 526 instructs the workflow executing server to execute the workflow using the resource upon workflow execution.

As explained in the foregoing, in the present embodiment, the third to fifth workflow execution instructing sections instruct the workflow executing server to execute the workflow in accordance with the resource preparation state made by the second resource preparing section 522 and the determination result made by the resource acquisition enabled/disabled determining section 524.

Figure 8:
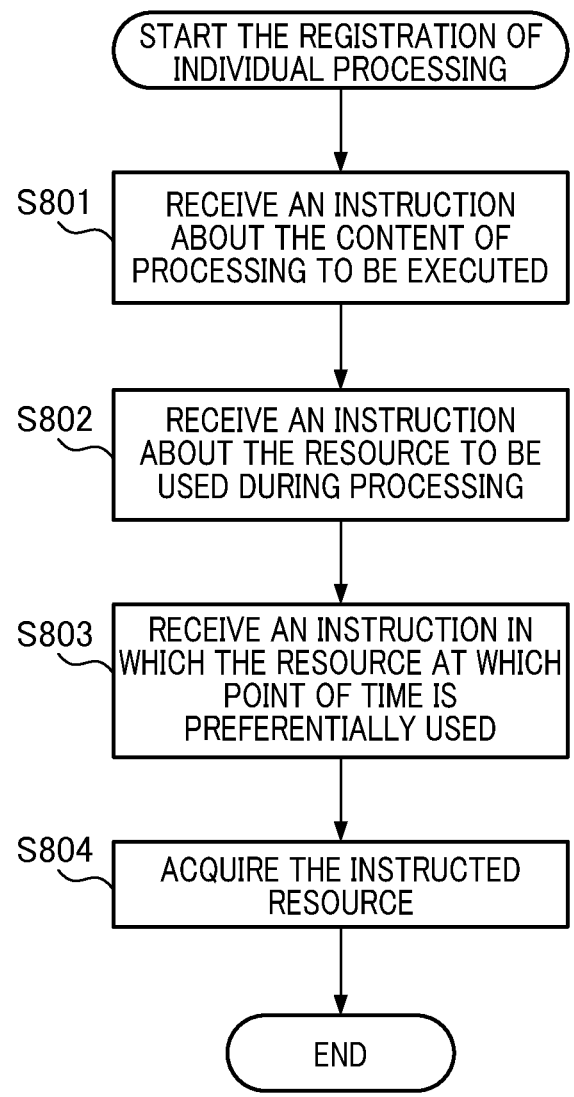
FIG. 8 is a flowchart showing an example of processing in the case in which the previously-acquired resource is used when a resource cannot be acquired upon workflow execution.

FIG. 8 is a flowchart according to the second embodiment of the present invention, which shows an example of processing in the case in which the resource to be used in the workflow is acquired in advance so as to use the previously-acquired resource when a resource cannot be acquired upon workflow execution.

Steps S801 to S804 are the flowchart for the registration of individual processing included in the workflow. It should be noted that the processing in steps S801 to S804 is executed in step S601 shown in FIG. 5 described above.

In step S801, the workflow generating section 511 receives an instruction about the content to be executed in the workflow from a user. In step S802, the use resource list generating section 512 receives an instruction from the user about the resource to be used in the workflow so as to generate a use resource list.

In step S803, the second use resource instruction receiving section 521 receives an instruction relating to the priority of the resource from the user. In other words, the second use resource instruction receiving section 521 receives an instruction about which resource either upon workflow registration or upon workflow execution is to be preferentially used. In step S804, the second resource preparing section 522 acquires the relevant resource in the use resource list that has been generated in step S802. Then, a series of operations is terminated.

Figure 9:
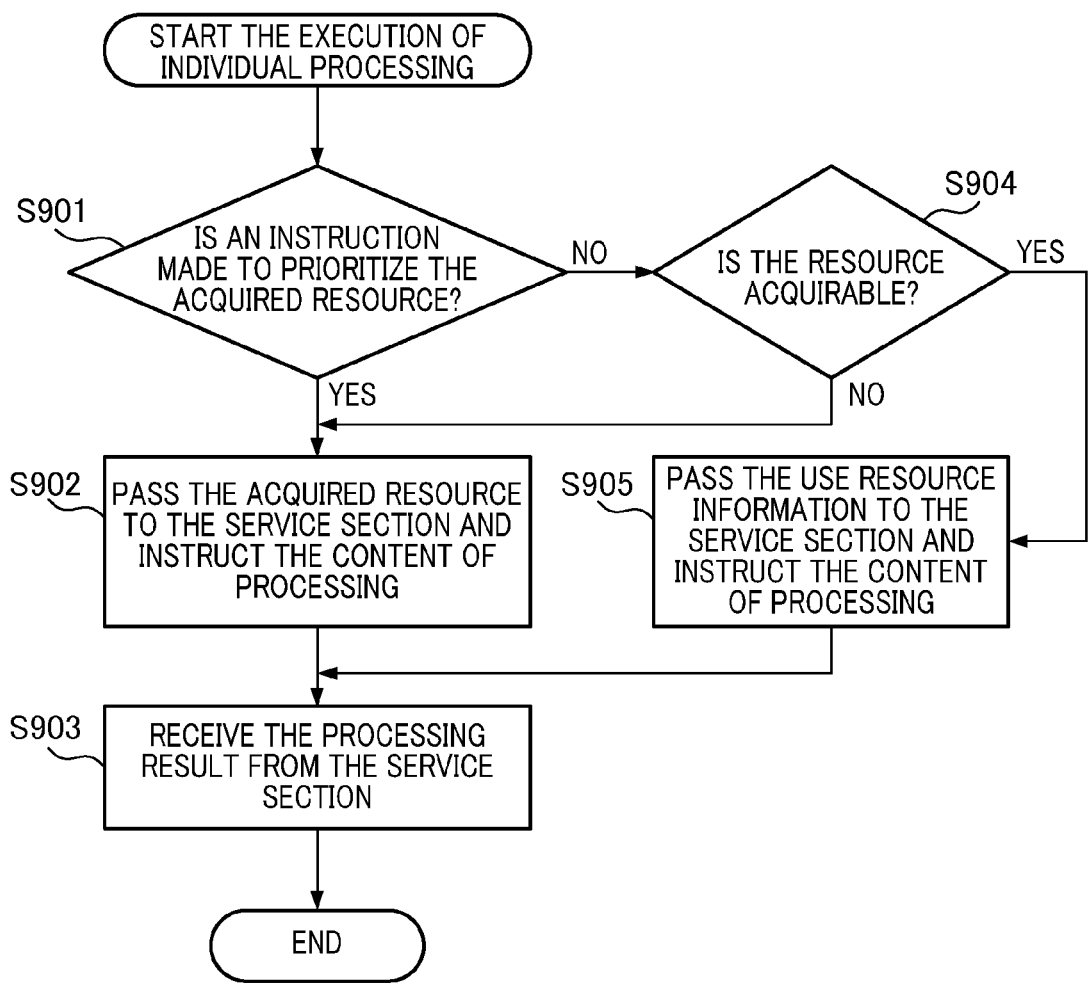
FIG. 9 is a flowchart showing an example of processing in the case in which the workflow is executed by using the previously-acquired resource and the priority information that has been received from the user.

FIG. 9 is a flowchart according to the second embodiment of the present invention, which shows an example of processing in the case in which the workflow is executed by using the previously-acquired resource and the priority information that has been received from the user. Steps S901 to S905 are the flowchart for the execution of individual processing included in the workflow. It should be noted that the processing in steps S901 to S905 are executed in step S701 shown in FIG. 6 described above.

In step S901, the workflow management service section 501 examines the instruction that has been received from the user by the second use resource instruction receiving section 521 so as to determine whether the priority is given to the acquired resource or the resource upon execution. As a result, if it is determined that the priority has been given to the acquired resource, the process advances to step S902. If it is determined that the priority has been given to the resource upon execution, the process advances to step S904.

In step S902, the third workflow execution instructing section 523 instructs the workflow executing servers 402 to 404 to execute the workflow so as to cause them to process the workflow by using the resource that has been previously acquired by the second resource preparing section 522. After the execution instruction of the workflow has been carried out, the process advances to step S903.

In step S903, the workflow management service section 501 waits for the execution result obtained in step S902 or step S905. The workflow management service section 501 receives the workflow execution result from the workflow executing servers 402 to 404, and then the process is terminated. In step S904, the resource acquisition enabled/disabled determining section 524 determines whether or not the resource to be used in the workflow is acquirable. As a result, if it is determined that the resource is not acquirable, the process advances to step S902. If it is determined that the resource is acquirable, the process advances to step S905.

In step S905, the fourth workflow execution instructing section 525 instructs the workflow executing servers 402 to 404 to execute the workflow by using the resource upon workflow execution. Then, the process advances to step S903.

According to the present embodiment, even if for some reason the required resource cannot be acquired upon workflow execution, the workflow execution can be continued by using the previously-acquired resource.

<Third Embodiment>

Next, the third embodiment according to the present invention will be described.

Figure 10:
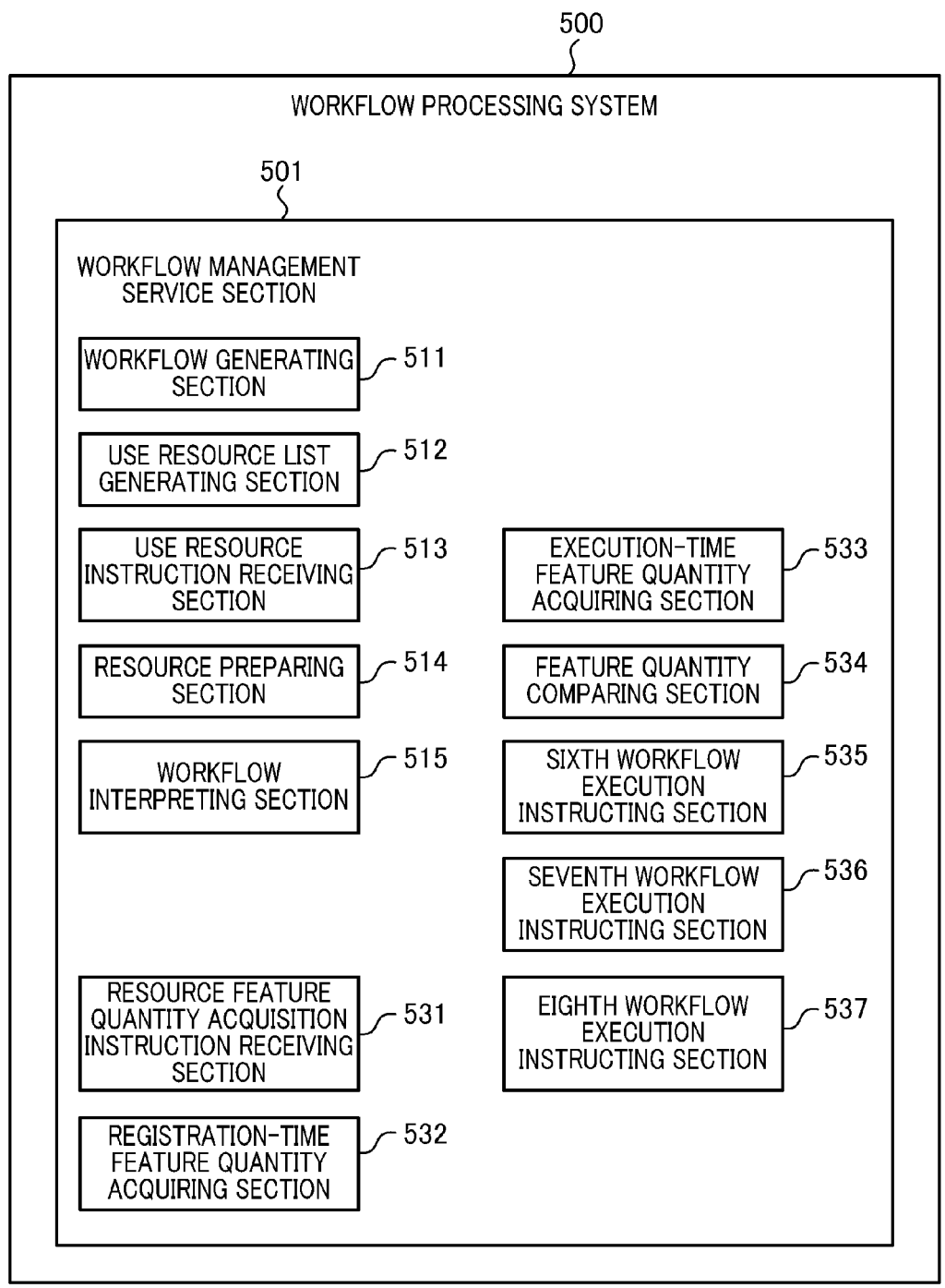
FIG. 10 is a view for explaining the third embodiment of the present invention in conjunction with FIGS. 11 and 12, and is a module configuration diagram showing a workflow management service section.

FIG. 10 is a module configuration diagram showing a workflow management service section according to the third embodiment of the present invention. The workflow management service section 501 includes the workflow generating section 511, the use resource list generating section 512, the use resource instruction receiving section 513, the resource preparing section 514, and the workflow interpreting section 515. Furthermore, a resource feature quantity acquisition instruction receiving section 531, a registration-time feature quantity acquiring section 532, an execution-time feature quantity acquiring section 533, and a feature quantity comparing section 534 are provided. In addition, three execution instruction sections, i.e., a sixth workflow execution instructing section 535, a seventh workflow execution instructing section 536, and an eighth workflow execution instructing section 537 are provided.

The workflow generating section 511 generates a workflow. The resource feature quantity acquisition instruction receiving section 531 receives an instruction about whether or not a feature quantity upon workflow registration is acquired for each resource in the generated resource list. For example, hash value or the like can be used for the feature quantity of the resource.

The registration-time feature quantity acquiring section 532 acquires and stores the feature quantity of the resource upon workflow registration (registration-time feature quantity), when the resource feature quantity acquisition instruction receiving section 531 has received an instruction to acquire the feature quantity. The execution-time feature quantity acquiring section 533 obtains the resource upon workflow execution so as to acquire and store its feature quantity (execution-time feature quantity), when the feature quantity that has been acquired by the registration-time feature quantity acquiring section 532 is present upon workflow execution.

The feature quantity comparing section 534 compares the registration-time feature quantity that has been acquired and stored by the registration-time feature quantity acquiring section 532 with the execution-time feature quantity that has been acquired by the execution-time feature quantity acquiring section 533. According to this comparison result, the sixth to eighth workflow execution instructing sections 535, 536, and 537 instruct the workflow executing servers 402 to 404 to execute the workflow. The sixth workflow execution instructing section 535 instructs the workflow executing servers 402 to 404 to execute the workflow using the resource upon workflow execution, when the registration-time feature quantity and the execution-time feature quantity are matched with each other.

Also, the seventh workflow execution instructing section 536 instructs the workflow executing servers 402 to 404 to execute the workflow using the resource when the registration-time feature quantity and the execution-time feature quantity do not match and the resource that has been prepared by the resource preparing unit 514 is present. The eighth workflow execution instructing section 537 instructs the workflow executing servers 402 to 404 to execute the workflow using the resource upon workflow execution, when the predetermined condition is fulfilled. The condition refers to the case where the registration-time feature quantity and the execution-time feature quantity do not match and the resource that has been prepared by the resource preparing section 514 is not present.

Figure 11:
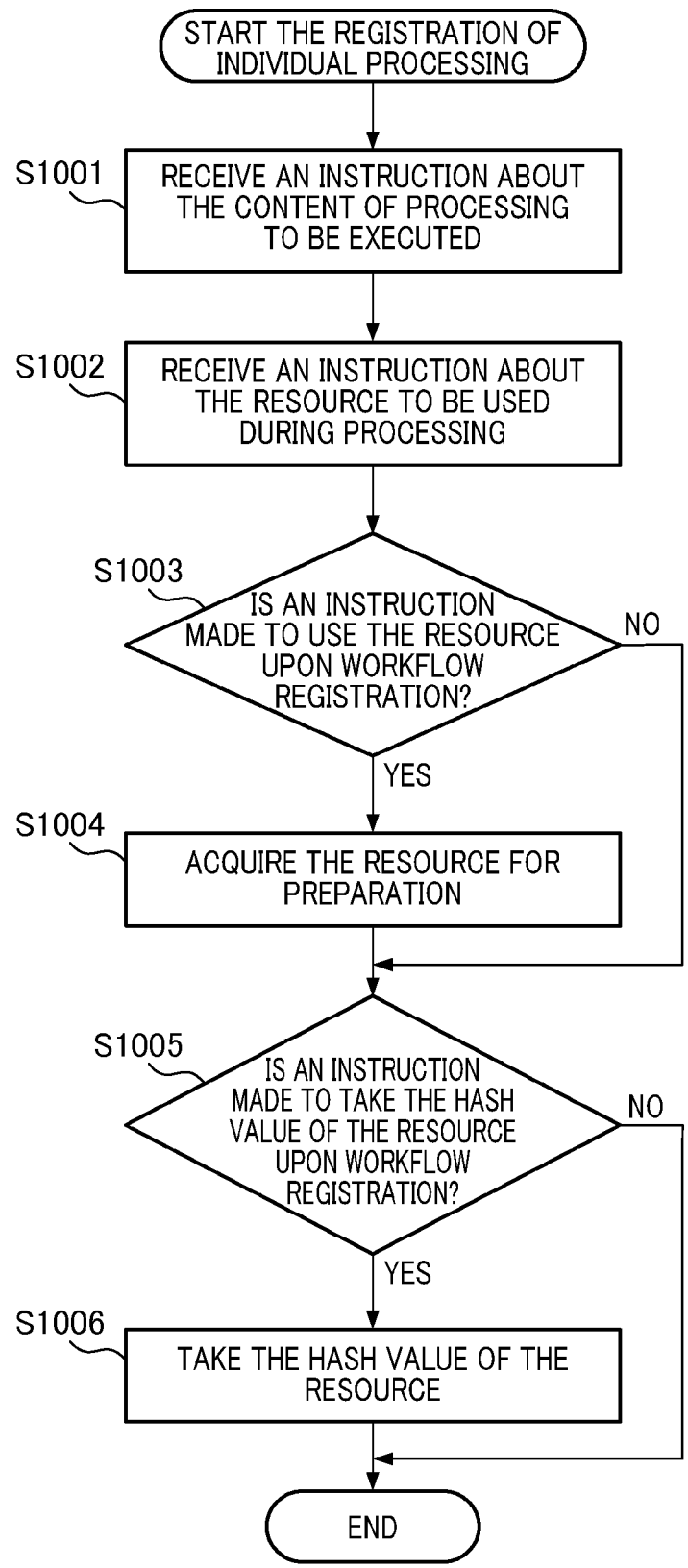
FIG. 11 is a flowchart showing an example of processing in the case in which the feature quantity of the resource to be used in the workflow is acquired in advance.

FIG. 11 is a flowchart according to the third embodiment of the present invention, which shows an example of processing in the case in which the feature quantity of the resource to be used in the workflow is acquired in advance.

Steps S1001 to S1006 are the flowchart for the registration of individual processing included in the workflow. It should be noted that the processing in steps S1001 to S1006 is executed in step S601 shown in FIG. 5 described above.

In step S1001, the workflow generating section 511 receives an instruction about the content to be executed in the workflow from a user.

In step S1002, the use resource list generating section 512 receives an instruction from the user about the resource to be used in the workflow so as to generate a use resource list.

In step S1003, the use resource instruction receiving section 513 receives an instruction from the user about whether the resource to be used in the workflow is the resource upon workflow registration or the resource upon workflow execution. If it is determined that an instruction to use the resource upon workflow registration has been provided, the process advances to step S1004. If it is determined that an instruction to use the resource upon workflow execution has been provided, the process advances to step S1005.

In step S1004, the resource preparing section 514 prepares such that the required resource is acquired in accordance with the content of the instruction that has been received from the user in step S1003. In other words, the resource preparing section 514 acquires the relevant resource in the use resource list that has been generated in step S1002, and the process advances to step S1005.

In step S1005, the resource feature quantity acquisition instruction receiving section 531 receives an instruction from the user about whether or not the feature quantity (hash value, etc.) of the resource is to be acquired. If the resource feature quantity acquisition instruction receiving section 531 is instructed to acquire the feature quantity, the process advances to step S1006, whereas if the resource feature quantity acquisition instruction receiving section 531 is instructed not to acquire the feature quantity, the process is terminated.

In step S1006, the registration-time feature quantity acquiring section 532 acquires and stores the feature quantity of the relevant resource in the use resource list that has been generated in step S1002 in accordance with the content of the instruction that has been received from the user in step S1005. Then, a series of operations is terminated.

Figure 12:
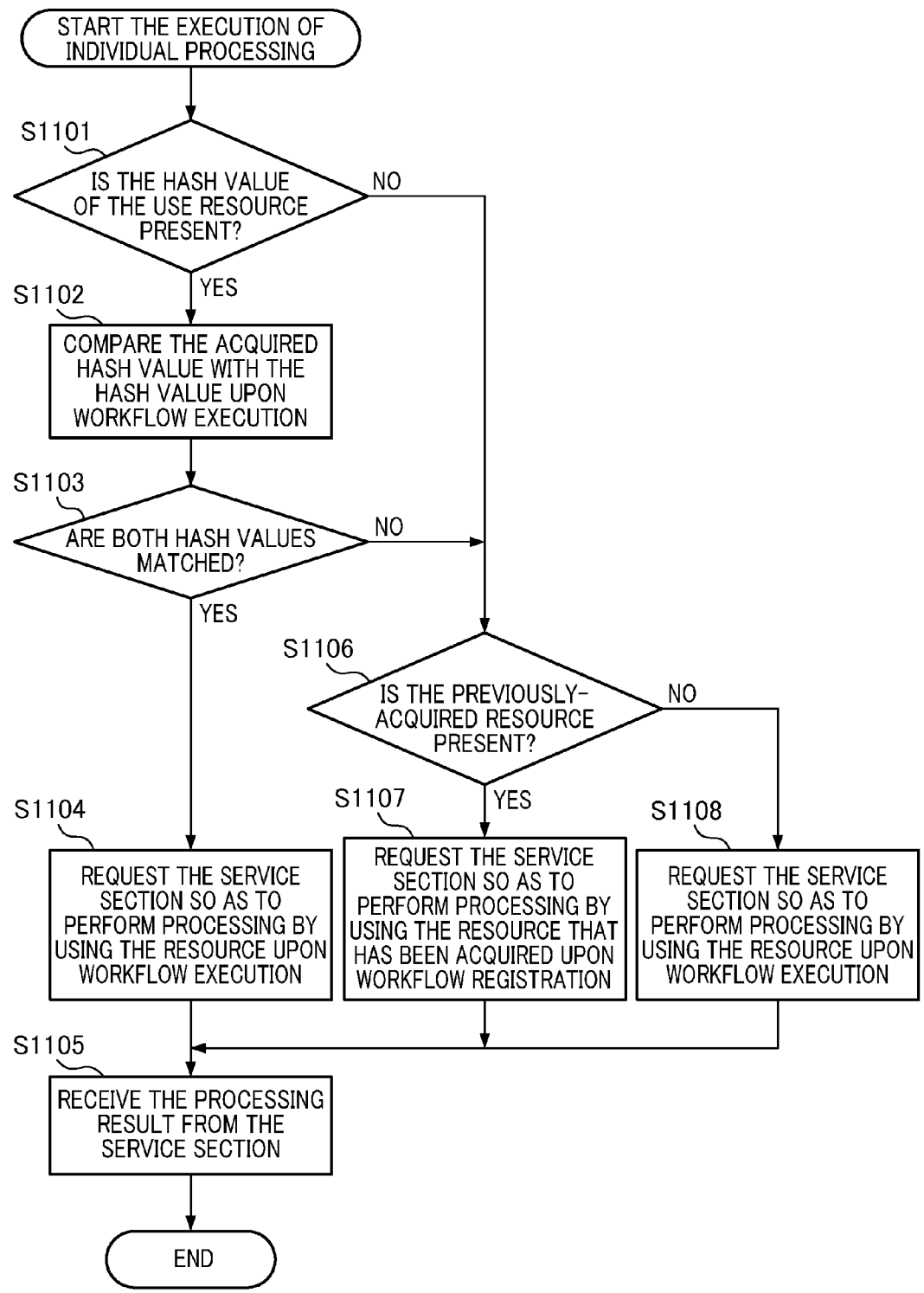
FIG. 12 is a flowchart showing an example of processing in the case in which the workflow is executed by using the previously-acquired resource and the resource feature quantity information.

FIG. 12 is a flowchart according to the third embodiment of the present invention, which shows an example of processing in the case in which the workflow is executed by using the previously-acquired resource and the resource feature quantity information.

Steps S1101 to S1108 are the flowchart for the execution of individual processing included in the workflow. It should be noted that the processing in steps S1101 to S1108 is executed in step S701 shown in FIG. 6 described above.

In step S1101, the workflow management service section 501 determines whether or not the registration-time feature quantity (e.g., hash value) that has been acquired and stored by the registration-time feature quantity acquiring section 532 is present. As a result, if the registration-time feature quantity is present, the process advances to step S1102, whereas if the registration-time feature quantity is not present, the process advances to step S1106.

In step S1102, the execution-time feature quantity acquiring section 533 acquires the execution-time feature quantity, and the feature quantity comparing section 534 compares the registration-time feature quantity with the execution-time feature quantity. As a result, if both match, the process advances to step S1104, whereas if they are different, the process advances to step S1106.

In step S1104, the sixth workflow execution instructing section 535 instructs the workflow executing servers 402 to 404 to execute the workflow by using the resource upon workflow execution. Then, the process advances to step S1105.

In step S1105, the workflow management service section 501 waits for the result of the workflow execution instruction received in step S1104, step S1107, or step S1108. The workflow management service section 501 receives the workflow execution result from the workflow executing servers 402 to 404, and then the process is terminated.

In step S1106, the workflow management service section 501 determines the presence or absence of the resource that has been previously acquired by the resource preparing section 514. As a result, if it is determined that the previously-acquired resource is present, the process advances to step S1107. If it is determined that the previously-acquired resource is not present, the process advances to step S1108.

In step S1107, the seventh workflow execution instructing section 536 instructs the workflow executing servers 402 to 404 to execute the workflow, causing them to process the workflow by using the resource that has been previously acquired by the resource preparing section 514. After the execution instruction of the workflow has been carried out, the process advances to step S1105.

In step S1108, the eighth workflow execution instructing section 537 instructs the workflow executing servers 402 to 404 to execute the workflow by using the resource upon workflow execution. Then, the process advances to step S1105.

According to the present embodiment, when the required resource has been previously acquired upon workflow registration and no change has been made to the feature quantity of the resource upon workflow execution, there is no need to send the previously-acquired resource to the workflow execution service section. On the other hand, if any change has been made to the feature quantity of the resource upon workflow execution, the workflow can be processed by using the previously-acquired resource.

<Fourth Embodiment>

Next, the fourth embodiment of the present invention will be described.

Figure 13:
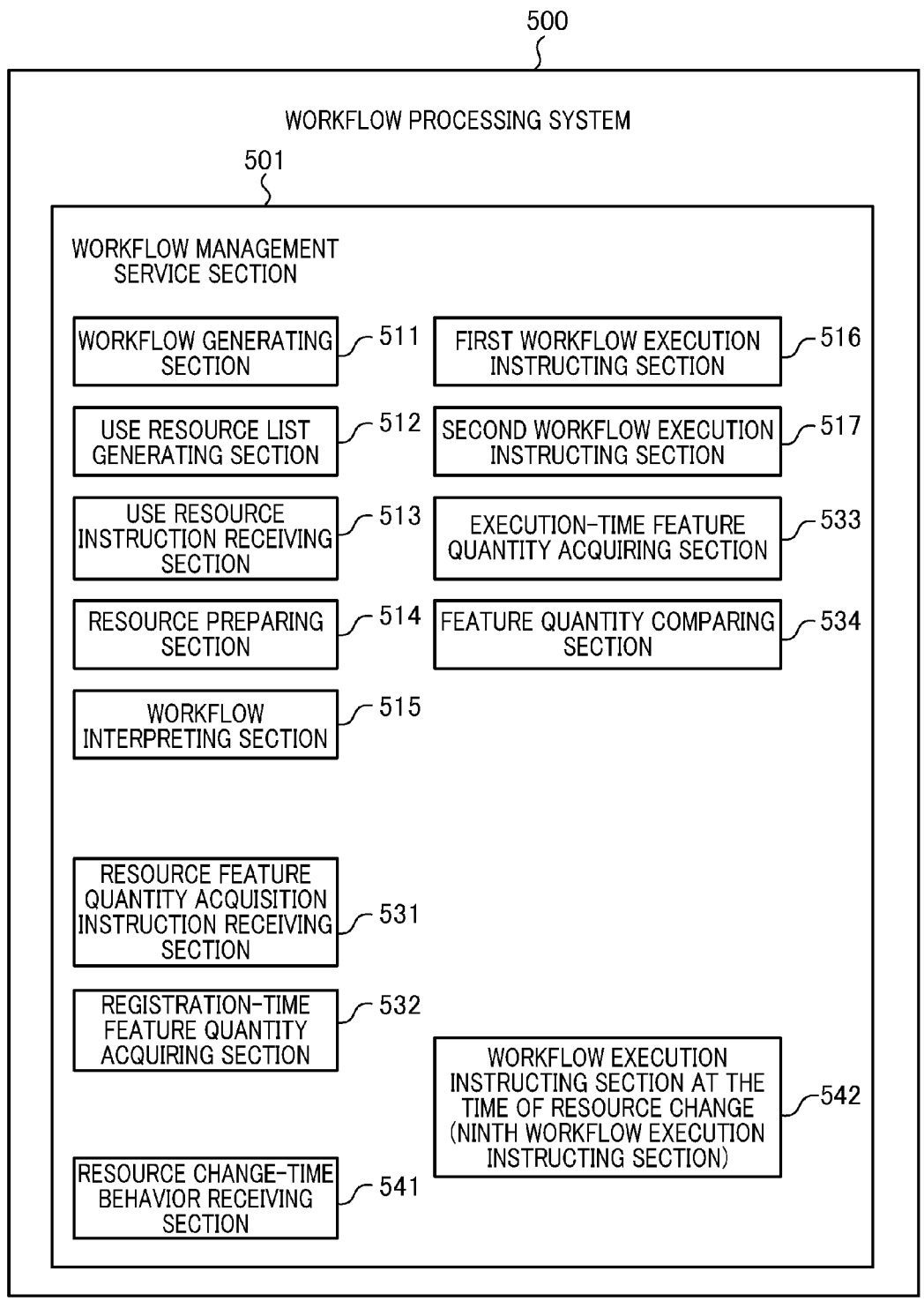
FIG. 13 is a view for explaining the fourth embodiment of the present invention in conjunction with FIGS. 14 and 15, and is a module configuration diagram showing a workflow management service section.

FIG. 13 is a module configuration diagram of a workflow management service section according to the fourth embodiment of the present invention. The workflow management service section 501 includes the workflow generating section 511, the use resource list generating section 512, the use resource instruction receiving section 513, the resource preparing section 514, and the workflow interpreting section 515. Furthermore, the first workflow execution instructing section 516, the second workflow execution instructing section 517, the resource feature quantity acquisition instruction receiving section 531, the registration-time feature quantity acquiring section 532, the execution-time feature quantity acquiring section 533, and the feature quantity comparing section 534 are provided. In addition to these components, a resource change-time behavior receiving section 541 and a ninth workflow execution instructing section (workflow execution instructing section upon resource change) 542 are provided.

The workflow interpreting section 515 interprets the workflow that has been generated by the workflow generating section 511. If it is determined that the feature quantity of the resources is different as a result of the comparison processing performed by the feature quantity comparing section 534, upon resource change the workflow execution instructing section 542 executes processing in accordance with the behavior that has been previously received by the resource change-time behavior receiving section 541. In other words, the resource change-time behavior receiving section 541 receives an instruction about the behavior of the case assuming that the feature quantity becomes different upon workflow execution when the registration-time feature quantity acquiring section 532 acquires the registration-time feature quantity of the resource. Then, the workflow execution instructing section 542 instructs the workflow executing servers 402 to 404 to execute processing that has been received by the resource change-time behavior receiving section 541, when the registration-time feature quantity and the execution-time feature quantity do not match each other as a result of a comparison performed by the feature quantity comparing section 534.

Figure 14:
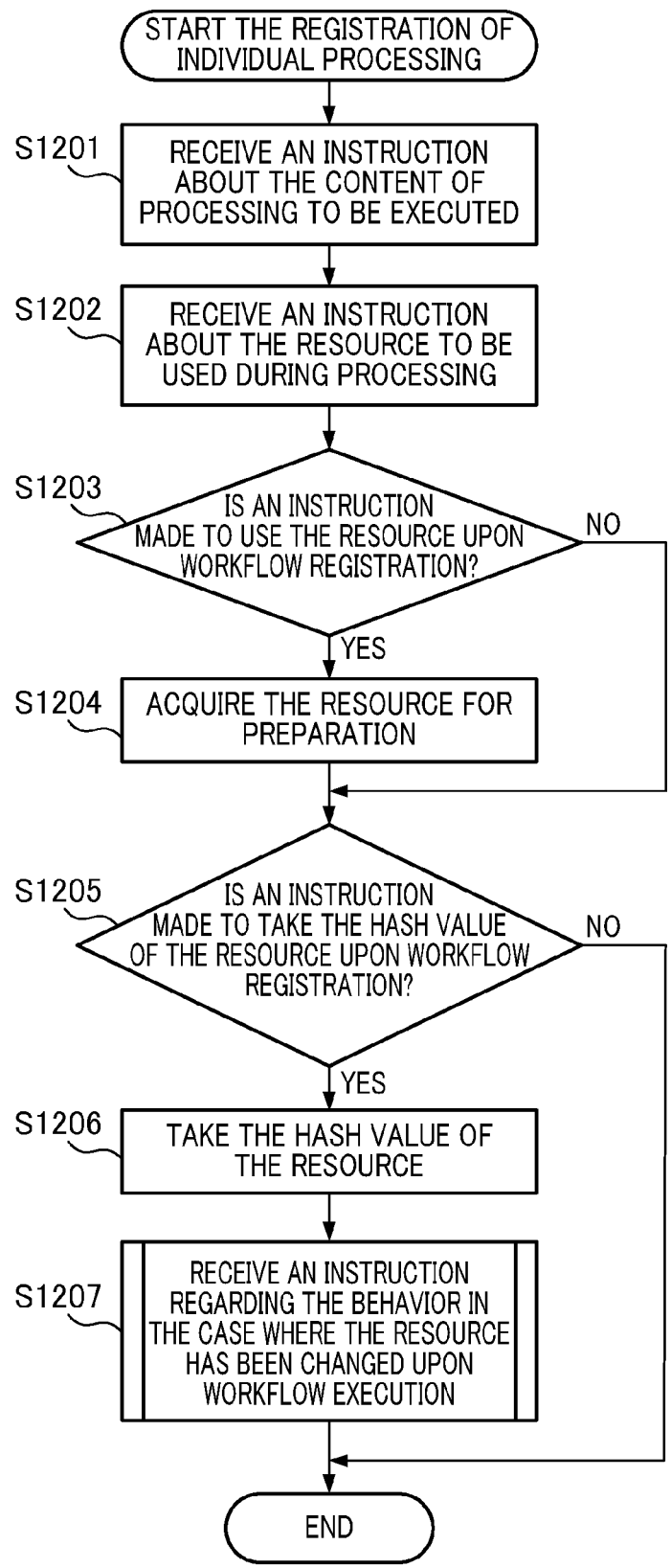
FIG. 14 is a flowchart showing an example of processing in the case in which a behavior, when the resource feature quantity is different upon workflow execution, has been previously received from a user.

FIG. 14 is a flowchart according to the fourth embodiment of the present invention, which shows an example of processing in the case in which a behavior, when the resource feature quantity is different upon workflow execution, is previously received from a user.

Steps S1201 to S1207 are the flowchart for the registration of individual processing included in the workflow. It should be noted that the processing in steps S1201 to S1207 is executed in step S601 shown in FIG. 5 described above.

In step S1201, the workflow generating section 511 receives an instruction about the content to be executed in the workflow from a user.

In step S1202, the use resource list generating section 512 receives an instruction from the user about the resource to be used in the workflow so as to generate a use resource list.

In step S1203, the use resource instruction receiving section 513 receives an instruction given from the user about whether the resource to be used in the workflow is the resource upon workflow registration or the resource upon workflow execution. If the section 513 is instructed to use the resource upon workflow registration, the process advances to step S1204. On the other hand, if the section 513 is instructed to use the resource upon workflow execution, the process advances to step S1205.

In step S1204, the resource preparing section 514 acquires the relevant resource in the use resource list that has been generated in step S1202, in accordance with the instruction content that has been received from the user in step S1203. Then, the process advances to step S1205.

In step S1205, the resource feature quantity acquisition instruction receiving section 531 receives an instruction about whether or not the resource feature quantity is acquired from a user. If the section 531 is instructed to acquire the resource feature quantity, the process advances to step S1206. On the other hand, if the section 531 is instructed not to acquire the resource feature quantity, the process is terminated.

In step S1206, the registration-time feature quantity acquiring section 532 acquires and stores the feature quantities of the relevant resources in the use resource list that has been generated in step S1202, in accordance with the instruction content that has been received from the user in step S1205, and the process advances to step S1207.

In step S1207, the resource change-time behavior receiving section 541 receives the behavior in the case where the feature quantity that has been acquired in step S1206 has not been matched with the execution-time feature quantity upon workflow execution from a user. Then, a series of operations is terminated.

Figure 15:
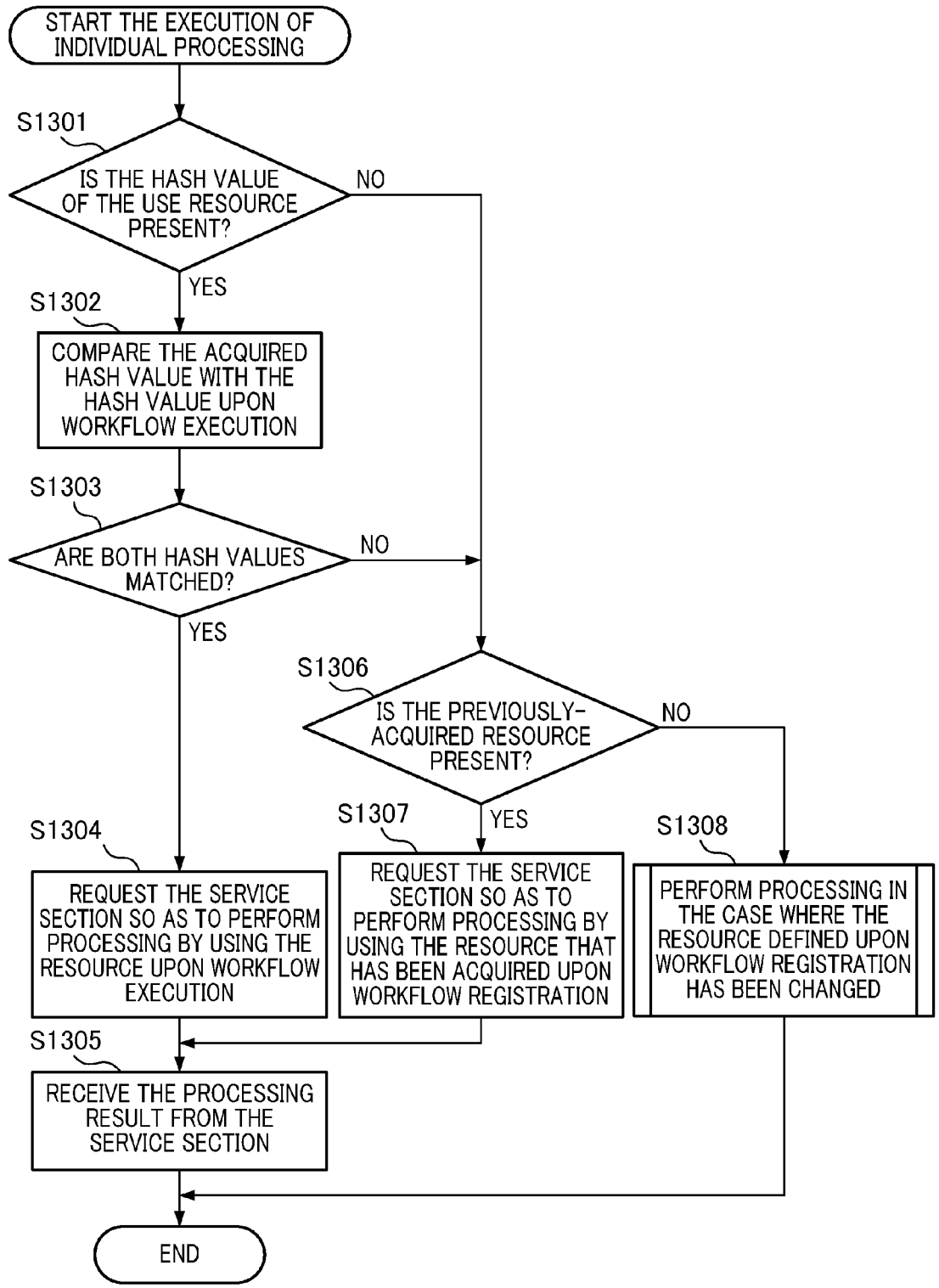
FIG. 15 is a flowchart showing an example of processing to be carried out in accordance with the behavior, which has been previously received from the user, upon a resource change, when the resource feature quantity is different upon workflow execution.

FIG. 15 is a flowchart according to the fourth embodiment of the present invention, which shows an example of processing to be carried out in accordance with the behavior, which has been previously received from the user, upon resource change, when the execution-time feature quantity of the resource according to the workflow is different from the registration-time feature quantity.

Steps S1301 and S1308 are the flowchart for the execution of individual processing included in the workflow. It should be noted that the processing in steps S1301 and S1308 is executed in step S701 shown in FIG. 6 described above.

In step S1301, the workflow management service section 501 determines whether or not the registration-time feature quantity that has been acquired by the registration-time feature quantity acquiring section 532 is present. As a result, if the registration-time feature quantity is present, the process advances to step S1302. If the registration-time feature quantity is not present, the process advances to step S1306.

In step S1302, the execution-time feature quantity acquiring section 533 acquires the execution-time feature quantity of the resource, and the feature quantity comparing section 534 compares the registration-time feature quantity with the execution-time feature quantity. As a result of comparison, if both match, the process advances to step S1304. On the other hand, if they do not match, the process advances to step S1306.

In step S1304, the first workflow execution instructing section 516 instructs the workflow executing servers 402 to 404 to execute the workflow by using the resource upon workflow execution. Then, the process advances to step S1305.

In step S1305, the workflow management service section 501 waits for the result of the workflow execution instruction received in step S1304, step S1307, or step S1308. The workflow management service section 501 receives the workflow execution result from the workflow executing servers 402 to 404, and then a series of operations is terminated.

In step S1306, the workflow management service section 501 determines whether or not the resource that has been previously acquired by the resource preparing section 514 is present. As a result, if it is determined that the previously-acquired resource is present, the process advances to step S1307. On the other hand, if it is determined that the previously-acquired resource is not present, the process advances to step S1308.

In step S1307, the second workflow execution instructing section 517 instructs the workflow executing servers 402 to 404 to execute the workflow so as to cause them to process the workflow by using the resource that has been previously acquired by the second resource preparing section 514. After the execution instruction of the workflow has been made, the process advances to step S1305.

In step S1308, the workflow execution instructing section 542 executes processing in accordance with the behavior upon resource change that has been received from the user in step S1207. Then, a series of operations is terminated.

According to the present embodiment, if the feature quantity of the necessary resource has been previously acquired upon workflow registration, the workflow can be executed in accordance with the processing that has been previously specified by a user, when it is determined that the feature quantity has been changed upon workflow execution.

<Fifth Embodiment>

Hereinafter, the fifth embodiment of the present invention will be described.

Figure 16:
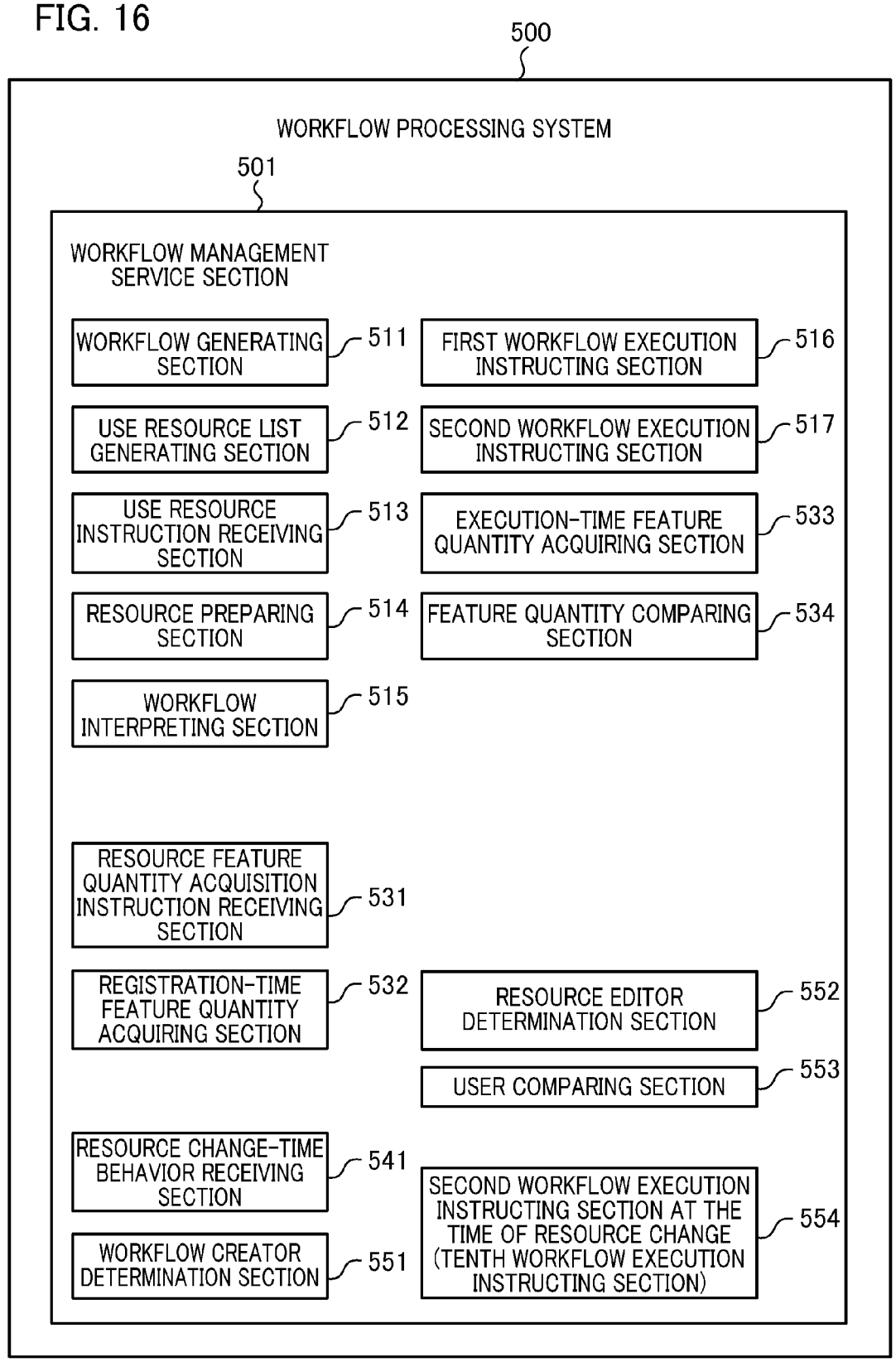
FIG. 16 is a view for explaining the fifth embodiment of the present invention in conjunction with FIGS. 17 and 18, and is a module configuration diagram showing a workflow management service section.

FIG. 16 is a view for explaining the fifth embodiment of the present invention and is a module configuration diagram of a workflow management service section. The workflow management service section 501 includes the workflow generating section 511, the use resource list generating section 512, the use resource instruction receiving section 513, the resource preparing section 514, and the workflow interpreting section 515. Furthermore, the first workflow execution instructing section 516, the second workflow execution instructing section 517, the resource feature quantity acquisition instruction receiving section 531, the registration-time feature quantity acquiring section 532, the execution-time feature quantity acquiring section 533, the feature quantity comparing section 534, and the resource change-time behavior receiving section 541 are provided. In addition to these components, a workflow creator determining section 551, a resource editor determining section 552, a user comparing section 553, and a tenth workflow execution instructing section 554 are provided. It should be noted that the workflow execution instructing section 554 corresponds to the second workflow execution instructing section upon resource change.

The workflow creator determining section 551 determines the user (workflow creator) who has generated the workflow at the workflow generating section 511. The resource editor determining section 552 determines who the resource editor upon workflow execution is. Then, the user comparing section 553 compares the workflow creator with the last editor of the resource. As a result of comparison, if the workflow creator and the last editor of the resource do not match, the workflow execution instructing section 554 upon resource change instructs the workflow executing servers 402 to 404 in accordance with the behavior that has been previously received by the resource change-time behavior receiving section 541. In other words, these workflow executing servers are instructed to execute the workflow by using the resource upon workflow execution.

Figure 17:
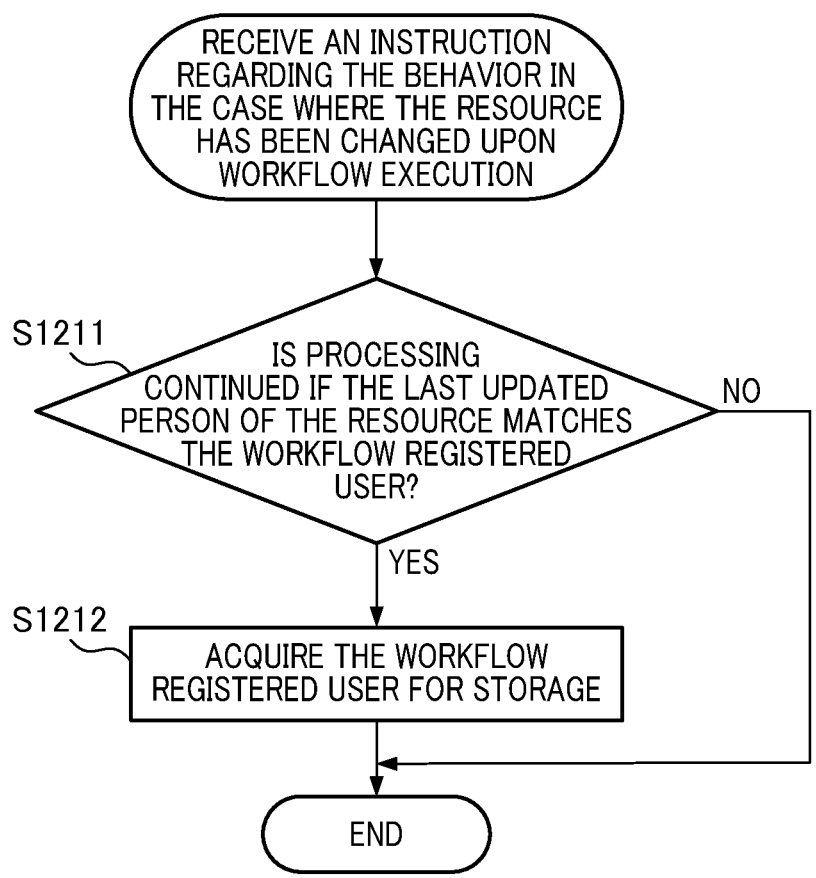
FIG. 17 is a flowchart showing an example of processing in the case in which, if the last person to update the resource matches the workflow creator, an instruction for continuing the workflow is received from a user even when the resource has been changed.

FIG. 17 is a flowchart according to the fifth embodiment of the present invention, which shows an example of processing in the case in which if it is determined that the last person to update the resource coincides with and is identical with the workflow creator, an instruction for continuing the workflow is received from a user even if the resource has been changed.

The flowchart in FIG. 17 is for the case in which steps S1211 and S1212 receive an instruction about the behavior for in the case where the resource has been changed, from a user. It should be noted that the processing in steps S1211 and S1212 is executed in step S1207 shown in FIG. 14 described above.

In step S1211, the resource change-time behavior receiving section 541 receives an instruction from a user about whether or not processing is to be continued, if the last person to update the resource matches the workflow registrant when the execution-time feature quantity is different from the registration-time feature quantity. If it is determined that the instruction that has been received from the user is to continue the workflow, the process advances to step S1212. If a user instruction is to stop the workflow regardless of the last person to update the resource when the execution-time feature quantity is different from the registration-time feature quantity, the workflow is stopped, and a series of operations is terminated.

In step S1212, the workflow creator determining section 551 determines the user who is directing the workflow generating instruction to the workflow generating section 511. Data representing the specified user is stored in a memory.

Figure 18:
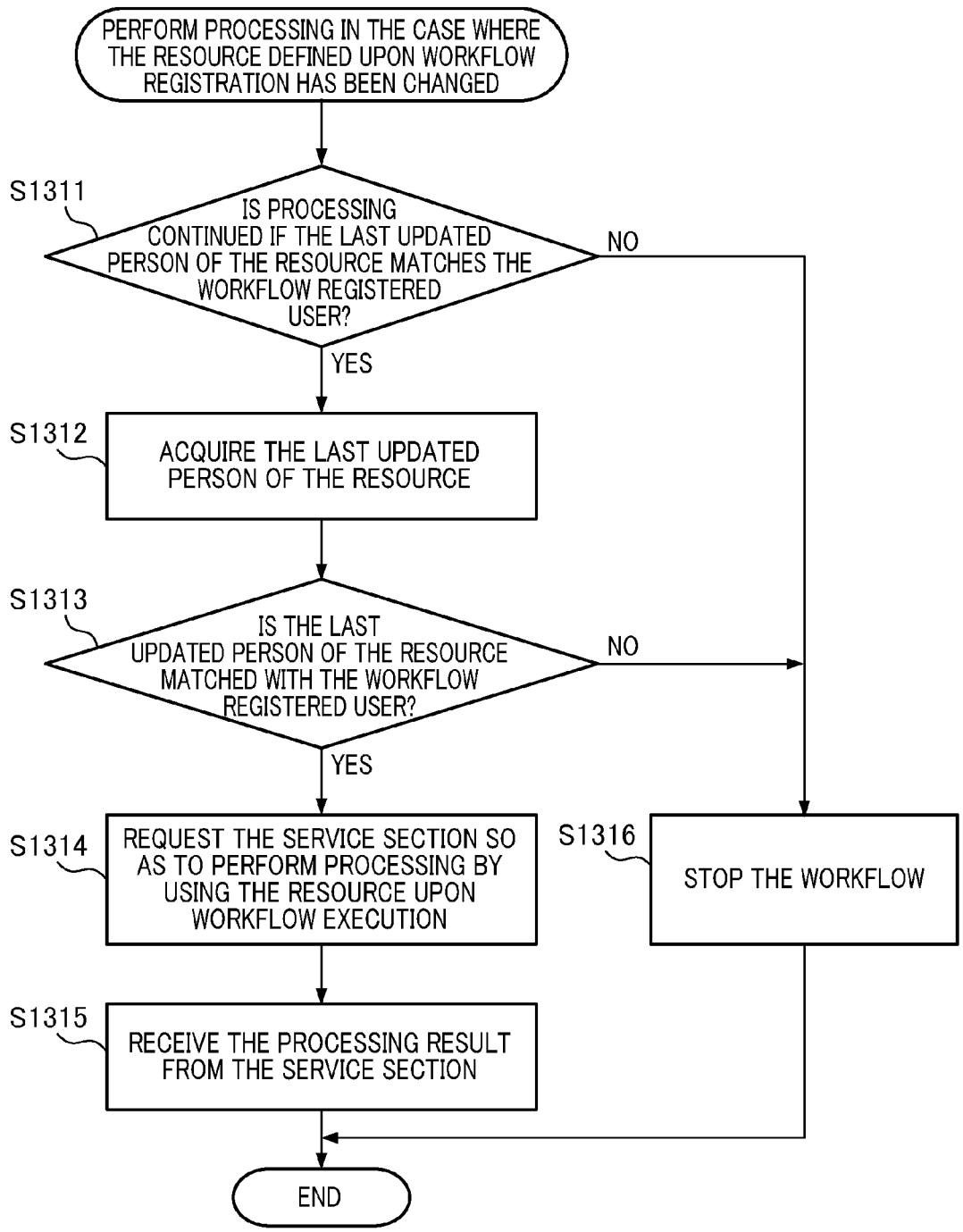
FIG. 18 is a flowchart showing an example of processing in the case in which, if the last person to update the resource matches the workflow creator, the workflow is continued even when the resource has been changed.

FIG. 18 is a flowchart according to the fifth embodiment of the present invention, which shows an example of processing in the case in which, if the last person to update the resource matches the workflow creator, the workflow is continued even if the resource has been changed. It should be noted that the processing in steps S1311 to S1316 is executed in step S1308 shown in FIG. 15 described above.

In step S1311, the workflow management service section 501 determines the instruction that has been received from the user in the step S1211. In other words, the workflow management service section 501 determines whether or not the received instruction is to continue processing even if the resource has been changed as long as the last person to update the resource matches the workflow registrant. As a result, if the received instruction is to continue processing when the last person to update the resource matches the workflow registrant, the process advances to step S1312. If the received instruction is to stop the workflow regardless of the intention of the last person to update the resource when the execution-time feature quantity is different from the registration-time feature quantity, the process advances to step S1316.

In step S1312, the resource editor determining section 552 acquires the last person to update the resource upon workflow execution, and the process advances to step S1313.

In step S1313, the user comparing section 553 compares the workflow creator who has been acquired in step S1212 with the last person to update the resource who has been acquired in step S1312. As a result of the comparison, when both match, the process advances to step S1314. When both do not match, the process advances to step S1316.

In step S1314, the workflow execution instructing section 554 instructs the workflow executing servers 402 to 404 to execute the workflow by using the resource upon workflow execution. Then, the process advances to step S1315.

In step S1315, the workflow management service section 501 waits for the result of the workflow execution instruction received in step S1314. The workflow management service section 501 receives the workflow execution result from the workflow executing servers 402 to 404, and then a series of operations is terminated.

In step S1316, the workflow management service section 501 stops the workflow because the last person to update the resource upon workflow execution is different from the workflow creator, and then the process is terminated.

According to the present embodiment, if the user who made the change matches the workflow creator, the workflow can be processed by using the resource upon workflow execution even when the resource has been changed upon workflow execution.

<Sixth Embodiment>

Hereinafter, the sixth embodiment of the present invention will be described.

Figure 19:
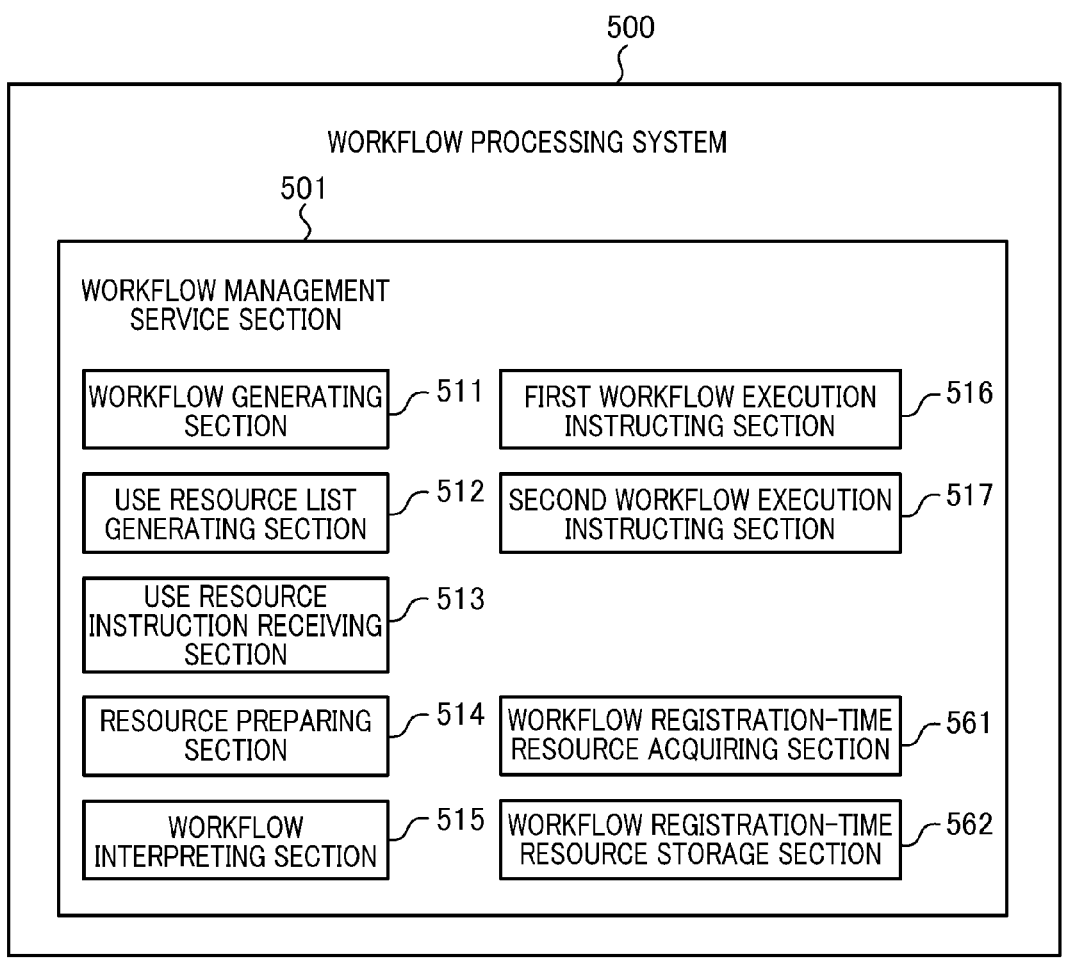
FIG. 19 is a view for explaining the sixth embodiment of the present invention in conjunction with FIG. 20, and is a module configuration diagram showing a workflow management service section.

FIG. 19 is a module configuration diagram of a workflow management service section according to the sixth embodiment of the present invention. The workflow management service section 501 includes the workflow generating section 511, the use resource list generating section 512, the use resource instruction receiving section 513, the resource preparing section 514, and the workflow interpreting section 515, the first workflow execution instructing section 516, and the second workflow execution instructing section 517. Furthermore, a workflow registration-time resource acquiring section 561 and a workflow registration-time resource storage section 562 are provided.

The resource preparing section 514 acquires the resource upon workflow registration from the workflow registration-time resource acquiring section 561, and stores the resource in the workflow registration-time resource storage section 562. In other words, when the resource preparation is made by the resource preparing section 514, the workflow registration-time resource acquiring section 561 has previously acquired the resource upon workflow registration. Then, the workflow registration-time resource storage section 562 stores the resource that has been acquired by the workflow registration-time resource acquiring section 561.

Figure 20:
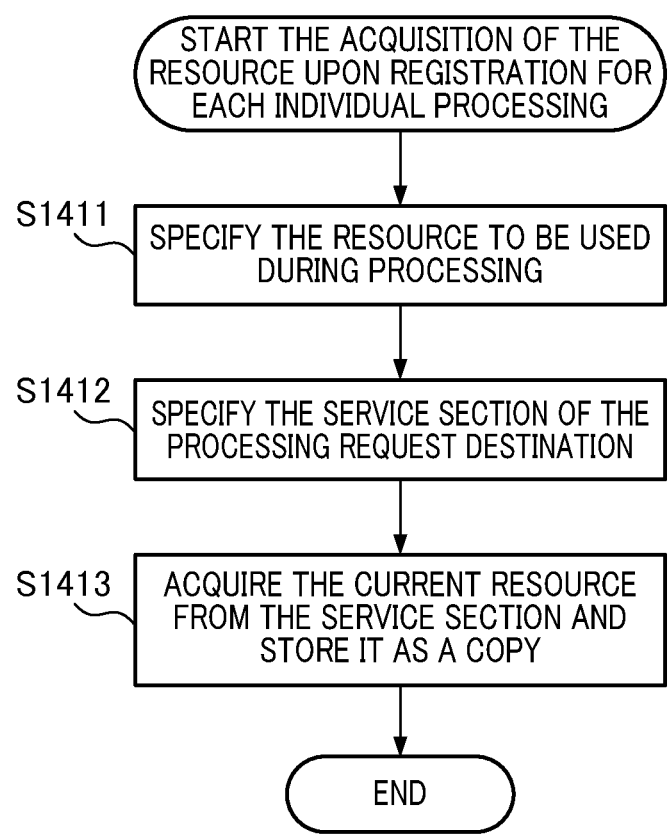
FIG. 20 is a flowchart showing an example of processing in the case in which the resource upon workflow registration is stored.

FIG. 20 is a flowchart according to the sixth embodiment of the present invention flowchart, which shows an example of processing in the case in which the resource upon workflow registration is stored.

Steps S1411 to S1413 are a flowchart for storing the resource upon workflow registration in accordance with the instruction of the resource preparing section 514. It should be noted that the processing in steps S1411 to S1413 is executed in step S615 shown in FIG. 5 described above.

In step S1411, the resource preparing section 514 specifies the resource to be used in the workflow.

In step S1412, the workflow registration-time resource acquiring section 561 specifies whether the resource that has been specified in step S1411 is used in the server or its service section of any of the workflow executing servers 402 to 404.

In step S1413, the workflow registration-time resource acquiring section 561 makes a request for the resource that has been specified in step S1411 to the server or service section that has been specified in step S1412. The workflow registration-time resource storage section 562 stores the obtained resource in accordance with the request. After the resource is stored, the process is terminated.

According to the present embodiment, the resource that is required upon workflow execution can be previously acquired upon workflow registration so as to store it in the resource storage section in the workflow management service section.

<Seventh Embodiment>

Hereinafter, the seventh embodiment of the present invention will be described.

Figure 21:
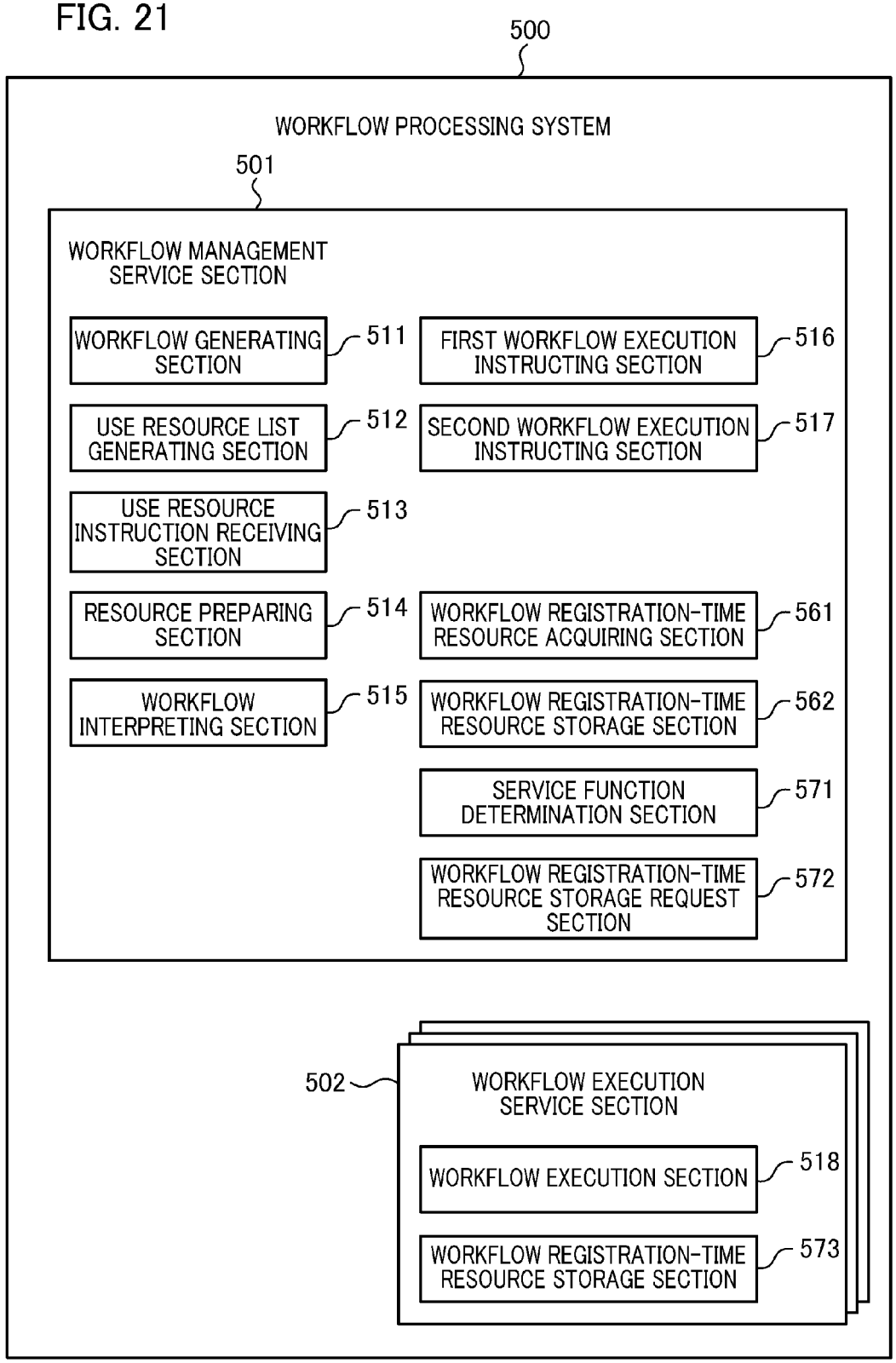
FIG. 21 is a view for explaining the seventh embodiment of the present invention in conjunction with FIG. 22, and is a module configuration diagram showing a workflow processing system.

FIG. 21 is a module configuration diagram of a workflow processing system according to the seventh embodiment of the present invention. The workflow processing system is constituted by the workflow management service section 501 and a plurality of the workflow execution service sections 502. The workflow management service section 501 includes the workflow generating section 511, the use resource list generating section 512, the use resource instruction receiving section 513, the resource preparing section 514, and the workflow interpreting section 515. Furthermore, the first workflow execution instructing section 516, the second workflow execution instructing section 517, the workflow registration-time resource acquiring section 561, and the workflow registration-time resource storage section 562 are provided. In addition to these components, a service function determining section 571 and a workflow registration-time resource storage requesting section 572 are provided.

The workflow execution service section 502 includes a workflow execution section 518, and may also include a second workflow registration-time resource storage section 573 (second upon registration resource storage section). The service function determining section 571 included in the workflow management service section 501 determines whether or not the workflow execution service section 502 includes the second workflow registration-time resource storage section 573. When the workflow execution service section 502 includes the workflow registration-time resource storage section 573, the workflow registration-time resource storage requesting section 572 requests the workflow execution service section 502 to store the resource upon workflow registration.

Figure 22:
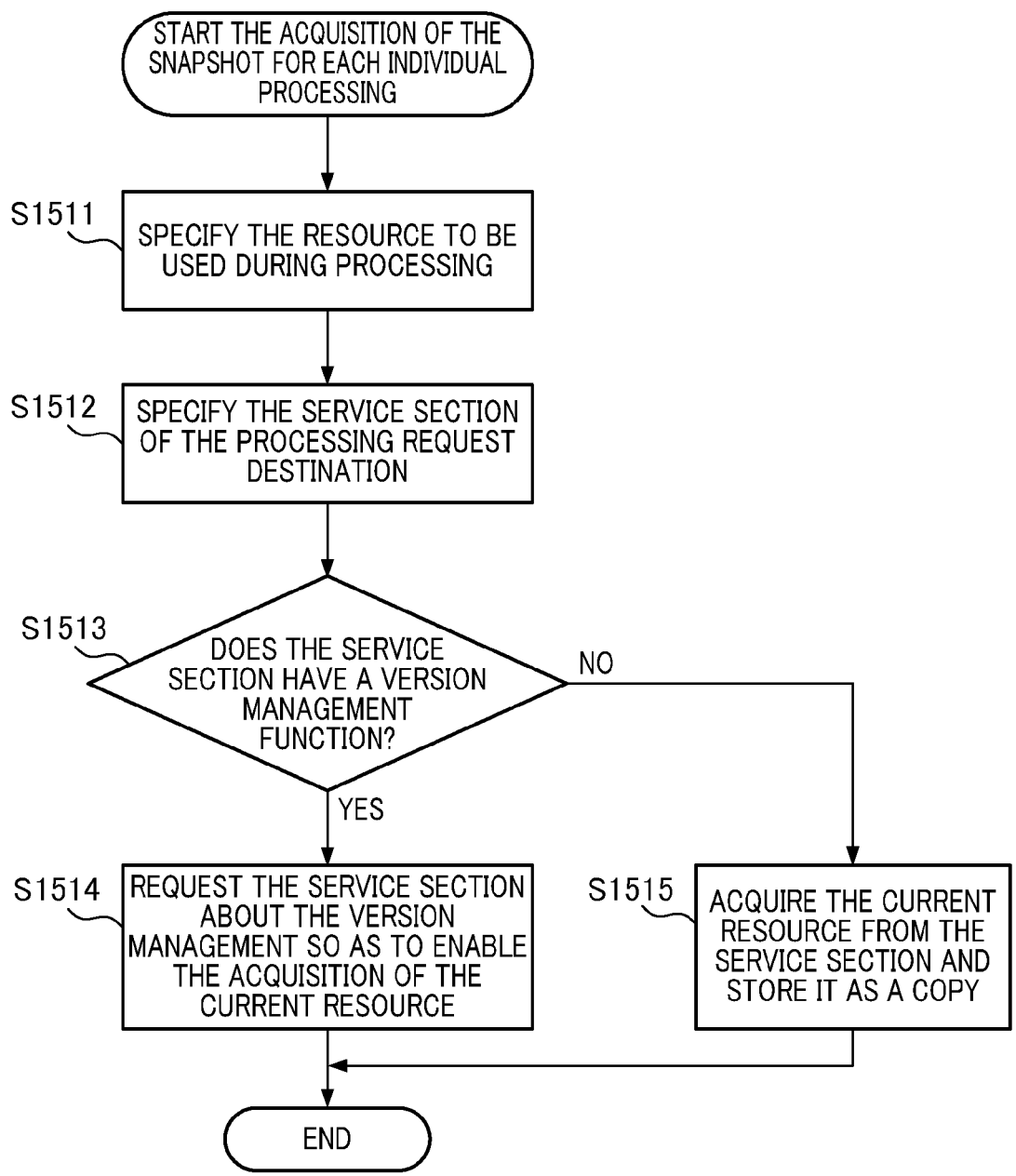
FIG. 22 is a flowchart showing an example of processing for requesting a workflow execution service section so as to store the resource, when the workflow execution service section includes a resource storage section.

FIG. 22 is a flowchart according to the seventh embodiment of the present invention flowchart, which shows an example of processing for requesting a workflow execution service section so as to store the resource, when the workflow execution service section includes a resource storage section. It should be noted that the processing in steps S1511 and S1515 is executed in step S615 shown in FIG. 5 described above.

In step S1511, the resource preparing section 514 specifies the resource to be used in the workflow.

In step S1512, the workflow registration-time resource acquiring section 561 specifies which service section of the workflow executing servers 402 to 404 uses the resource that has been specified step S1511.

In step S1513, the service function determining section 571 determines whether or not the service section that has been specified in step S1512 has a version management function. As a result, if it is determined that the service section that has been specified in step S1512 has a version management function, the process advances to step S1514. On the other hand, if it is determined that the service section does not have a version management function, the process advances to step S1515.

In step S1514, the workflow registration-time resource storage requesting section 572 requests the service section that has been specified in step S1512 to store the state of the resource, which has been specified in step S1511, upon workflow registration. Then, a series of operations is terminated. In step S1515, the workflow registration-time resource acquiring section 561 requests the resource, which has been specified in step S1511, to the service section that has been specified in step S1512. In response, the workflow registration-time resource storage section 562 stores the obtained resource. After the resource is stored, a series of operations is terminated.

According to the present embodiment, when the workflow execution service section includes the resource storage section, the resource that is required upon workflow execution can be stored in the workflow execution service section.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-058735 filed Mar. 11, 2009 which is hereby incorporated by reference herein it its entirety.

What is claimed is:

1. A workflow processing system comprising:
a workflow managing unit configured to register or store a workflow;
a generating unit configured to generate a resource list relating to at least a part of a resource to be used in the workflow;
a receiving unit configured to receive an instruction indicating whether the resource is to be used either upon workflow registration or upon workflow execution for each resource in the resource list;
an acquiring unit configured to acquire the resource from an external database that stores the resource upon workflow registration, when the receiving unit receives an instruction to use the resource upon workflow registration;
a first comparing unit configured to compare a creator of the workflow with a last editor of the resource; and
an executing unit configured to interpret and execute the workflow that has been stored in the workflow managing unit,
wherein, if the last editor of the resource is matched with the creator of the workflow, the execution unit executes the workflow using the resource upon workflow execution,
wherein, if the last editor of the resource is not matched with the creator of the workflow, the execution unit terminates execution of the workflow,
wherein, if the resource upon workflow registration is acquired by the acquiring unit, the executing unit executes the workflow using the resource that has been acquired by the acquiring unit, and
wherein, if the resource upon workflow registration is not acquired by the acquiring unit, the executing unit executes the workflow using the resource which is stored in the external database upon workflow execution.

2. The workflow processing system according to claim 1, wherein the instruction received by the receiving unit is an instruction for prioritizing the use of the resource upon workflow registration.

3. The workflow processing system according to claim 1, further comprising:
a feature quantity storing unit configured to acquire and store a feature quantity for each resource in the resource list upon workflow registration;
a feature quantity acquiring unit configured to acquire the feature quantity for each resource in the resource list upon workflow execution; and
a second comparing unit configured to compare the feature quantity that has been stored in the feature quantity storing unit with the feature quantity that has been acquired by the feature quantity acquiring unit,
wherein, if it is found as a result of comparison performed by the second comparing unit that both of the feature quantities match, the executing unit executes the workflow using the resource upon workflow execution, and
wherein, if it is found that as a result of comparison performed by the second comparing unit that both of the feature quantities do not match, the executing unit executes the workflow depending on whether or not the resource upon workflow registration is acquired by the acquiring unit.

4. The workflow processing system according to claim 3, further comprising:
a determining unit configured to determine whether or not the feature quantity is stored in the feature quantity storing unit,
wherein, if it is found as a result of determination performed by the determining unit that the feature quantity is stored, the executing unit executes the workflow in accordance with the comparison result performed by the second comparing unit, and
wherein, if it is found as a result of determination performed by the determining unit that the feature quantity is not stored, the executing unit executes the workflow depending on whether or not the resource upon workflow registration is acquired by the acquiring unit.

5. A method for controlling a workflow processing system, comprising:
registering or storing a workflow in a workflow managing unit;
generating a resource list relating to at least a part of a resource to be used in the workflow;
receiving an instruction indicating whether the resource is to be used either upon workflow registration or upon workflow execution for each resource in the resource list;
acquiring the resource from an external database that stores the resource upon workflow registration, when the receiving step has received an instruction to use the resource upon workflow registration;
comparing a creator of the workflow with a last editor of the resource; and
interpreting and executing the workflow that has been stored in the workflow managing unit,
wherein, if the last editor of the resource is matched with the creator of the workflow, the workflow is executed in the executing step using the resource upon workflow execution,
wherein, if the last editor of the resource is not matched with the creator of the workflow, execution of the workflow is terminated,
wherein, if the resource upon workflow registration is acquired by the acquiring step, the workflow is executed in the executing step using the resource that has been acquired by the acquiring step, and
wherein, if the resource upon workflow registration is not acquired by the acquiring step, the workflow is executed in the executing step using the resource which is stored in the external database upon workflow execution.

6. The method for controlling a workflow processing system according to claim 5, wherein the instruction provided by the receiving step is an instruction for prioritizing the use of the resource upon workflow registration.

7. The method for controlling a workflow processing system according to claim 5, further comprising:
acquiring and storing a feature quantity for each resource in the resource list upon workflow registration;
acquiring the feature quantity for each resource in the resource list upon workflow execution; and
comparing the feature quantity that has been stored in the feature quantity storing step with the feature quantity that has been acquired by the feature quantity acquiring step,
wherein, if it is found that both of the feature quantities match, the workflow is executed in the executing step using the resource upon workflow execution, and
wherein, if it is found that both of the feature quantities do not match, the workflow is executed in the executing step depending on whether or not the resource upon workflow registration is acquired by the acquiring step.

8. The method for controlling a workflow processing system according to claim 7, further comprising:

determining whether or not the feature quantity is stored in the storing step, wherein, if it is determined that the feature quantity is stored, the workflow is executed in the executing step in accordance with the comparison result of comparing the feature quantity, and wherein, if it is found as a result of determination performed by the determining step that the feature quantity is not stored, the workflow is executed in the executing step depending on whether or not the resource upon workflow registration is acquired by the acquiring step.

9. A non-transitory computer-readable storage medium storing a program, which, when executed by a processor, implements a method for controlling a workflow processing system, the method comprising:

registering or storing a workflow in a workflow managing unit;

generating a resource list relating to at least a part of a resource to be used in the workflow;

receiving an instruction indicating whether the resource is to be used either upon workflow registration or upon workflow execution for each resource in the resource list;

acquiring the resource from an external database that stores the resource upon workflow registration, when the receiving step has received an instruction to use the resource upon workflow registration; and comparing a creator of the workflow with a last editor of the resource; and interpreting and executing the workflow that has been stored in the workflow managing unit, wherein, if the last editor of the resource is matched with the creator of the workflow, the workflow is executed in the executing step using the resource upon workflow execution, wherein, if the last editor of the resource is not matched with the creator of the workflow, execution of the workflow is terminated, wherein, if the resource upon workflow registration is acquired by the acquiring step, the workflow is executed in the executing step using the resource that has been acquired by the acquiring step, and wherein, if the resource upon workflow registration is not acquired by the acquiring step, the workflow is executed in the executing step using the resource which is stored in the external database upon workflow execution.

* * * * *